(12) United States Patent
Shriner et al.

(10) Patent No.: US 11,974,096 B2
(45) Date of Patent: Apr. 30, 2024

(54) HEARING DEVICE SYSTEM INCORPORATING PHASED ARRAY ANTENNA ARRANGEMENT

(71) Applicant: STARKEY LABORATORIES, INC., Eden Prairie, MN (US)

(72) Inventors: Paul A. Shriner, Minneapolis, MN (US); Gregory J. Haubrich, Champlin, MN (US)

(73) Assignee: STARKEY LABORATORIES, INC., Eden Prairie, MN (US)

( * ) Notice: Subject to any disclaimer, the term of this patent is extended or adjusted under 35 U.S.C. 154(b) by 129 days.

(21) Appl. No.: 17/701,273

(22) Filed: Mar. 22, 2022

(65) Prior Publication Data

US 2022/0232329 A1    Jul. 21, 2022

Related U.S. Application Data

(63) Continuation of application No. PCT/US2020/052015, filed on Sep. 22, 2020.

(60) Provisional application No. 62/907,086, filed on Sep. 27, 2019.

(51) Int. Cl.
*H04R 25/02* (2006.01)
*H01Q 21/28* (2006.01)
*H04R 25/00* (2006.01)
*H04W 4/38* (2018.01)

(52) U.S. Cl.
CPC ............ *H04R 25/02* (2013.01); *H01Q 21/28* (2013.01); *H04R 25/554* (2013.01); *H04W 4/38* (2018.02)

(58) Field of Classification Search
CPC ....... H04R 25/02; H04R 25/554; H04W 4/38; H01Q 21/28
See application file for complete search history.

(56) References Cited

U.S. PATENT DOCUMENTS

| 5,905,473 A | 5/1999 | Taenzer |
| 2015/0325913 A1 | 11/2015 | Vagman |
| 2019/0182607 A1 | 6/2019 | Petersen et al. |
| 2020/0053490 A1* | 2/2020 | Shriner ................ H01Q 3/2617 |

OTHER PUBLICATIONS

PCT Search Report and Written Opinion for PCT/US2020/052015 dated Nov. 5, 2020 (13 pages).

* cited by examiner

*Primary Examiner* — Andrew L Sniezek
(74) *Attorney, Agent, or Firm* — Mueting Raasch Group

(57) ABSTRACT

A system comprises a first hearing device and a second hearing device each comprising a housing configured to be supported at, on or in the wearer's ear, a processor, memory, a radio frequency transceiver, and an antenna arrangement disposed in or on the housing and coupled to the transceiver and the processor. The antenna arrangement comprises an antenna coupled to a phase shifter. The processor is configured to adjust a phase shift of the phase shifter. The system also comprises a clock synchronization link between the transceivers, a second link configured to communicate received signal information between the transceivers, and a master processor defined by the processor of the first or second hearing device. The master processor is configured to cause the first and second hearing devices to operate the antenna arrangements as a phased array antenna arrangement via the clock synchronization link and the second link.

23 Claims, 11 Drawing Sheets

HEARING DEVICE SYSTEM INCORPORATING PHASED ARRAY ANTENNA ARRANGEMENT

RELATED APPLICATIONS

This application is a continuation of PCT Application No. PCT/US2020/052015, filed Sep. 22, 2020, which claims priority to U.S. Provisional Application No. 62/907,086, filed Sep. 27, 2019, the content of which are hereby incorporated by reference in their entireties.

TECHNICAL FIELD

This application relates generally to hearing devices, including ear-worn electronic devices, hearing aids, personal amplification devices, and other hearables.

BACKGROUND

Hearing devices provide sound for the wearer. Some examples of hearing devices are headsets, hearing aids, speakers, cochlear implants, bone conduction devices, and personal listening devices. For example, hearing aids provide amplification to compensate for hearing loss by transmitting amplified sounds to a wearer's ear canals. Hearing devices may be capable of performing wireless communication with other devices, such as receiving streaming audio from a streaming device via a wireless link. Wireless communication may also be performed for programming the hearing device and receiving information from the hearing device. For performing such wireless communication, hearing devices such as hearing aids may each include a wireless transceiver and an antenna.

SUMMARY

Embodiments are directed to a hearing device system comprising a first hearing device and a second hearing device adapted to be worn at first and second ears of a wearer. The system comprises a first hearing device and a second hearing device each comprising a housing configured to be supported at, on or in the wearer's ear, a processor coupled to memory, a radio frequency transceiver coupled to the processor, and an antenna arrangement disposed in or on the housing and coupled to the transceiver and the processor. The antenna arrangement comprises an antenna coupled to a phase shifter. The processor is configured to adjust a phase shift of the phase shifter. The system also comprises a clock synchronization link between the transceivers, a second link configured to communicate received signal information between the transceivers, and a master processor defined by the processor of the first or second hearing device. The master processor is configured to cause the first and second hearing devices to operate the antenna arrangements as a phased array antenna arrangement via the clock synchronization link and the second link.

Embodiments are directed to a hearing device system comprising a first hearing device and a second hearing device adapted to be worn at first and second ears of a wearer. The system comprises a first hearing device and a second hearing device each comprising a housing configured to be supported at, on or in the wearer's ear, a processor coupled to memory, a radio frequency transceiver coupled to the processor, and an antenna arrangement disposed in or on the housing and coupled to the transceiver and the processor. The antenna arrangement comprises an antenna coupled to a phase shifter and a variable gain amplifier. The processor is configured to adjust a phase shift of the phase shifter and a gain of the variable gain amplifier. The system also comprises a clock synchronization link between the transceivers, a second link configured to communicate received signal information between the transceivers, and a master processor defined by the processor of the first or second hearing device. The master processor is configured to cause the first and second hearing devices to operate the antenna arrangements as a phased array antenna arrangement via the clock synchronization link and the second link.

Embodiments are directed to a method implemented by a hearing device system comprising a first hearing device and a second hearing device each adapted to be worn at, on or in an ear of a wearer. The method comprises providing, at the first and second hearing devices, an antenna arrangement coupled to a radio frequency transceiver and a processor, the antenna arrangement comprising an antenna coupled to a phase shifter. The method also comprises adjusting a phase shift of the phase shifters by the processors of the first and second hearing devices. The method further comprises causing the first and second hearing devices to operate the antenna arrangements as a phased array antenna arrangement by a master processor defined by the processor of the first or second hearing device.

Embodiments are directed to a hearing device system comprising a first hearing device and a second hearing device adapted to be worn at first and second ears of a wearer. The system comprises a first hearing device and a second hearing device each comprising a housing configured to be supported at, on or in the wearer's ear, a processor coupled to memory, a radio frequency transceiver coupled to the processor, and an antenna arrangement disposed in or on the housing and coupled to the transceiver and the processor. The antenna arrangement comprises an antenna coupled to a phase shifter. The processor is configured to adjust a phase shift of the phase shifter. The system also comprises a clock synchronization link between the transceivers and a master processor defined by the processor of the first or second hearing device. The master processor is configured to cause the first and second hearing devices to operate the antenna arrangements as a phased array antenna arrangement in a coherent transmit mode by phase-locking the transceivers via the clock synchronization link.

Embodiments are directed to a hearing device system comprising a first hearing device and a second hearing device adapted to be worn at first and second ears of a wearer. The system comprises a first hearing device and a second hearing device each comprising a housing configured to be supported at, on or in the wearer's ear, a processor coupled to memory, a radio frequency transceiver coupled to the processor, and an antenna arrangement disposed in or on the housing and coupled to the transceiver and the processor. The antenna arrangement comprises an antenna coupled to a phase shifter. The processor is configured to adjust a phase shift of the phase shifter. The system also comprises a clock synchronization link between the transceivers, a second link configured to communicate received signal information between the transceivers, and a master processor defined by the processor of the first or second hearing device. The master processor is configured to cause the first and second hearing devices to operate the antenna arrangements as a phased array antenna arrangement in a coherent receive mode by phase-locking local oscillators of the transceivers via the clock synchronization link and the second link.

Embodiments are directed to a hearing device system comprising a first hearing device and a second hearing device adapted to be worn at first and second ears of a wearer. The system comprises a first hearing device and a second hearing device each comprising a housing configured to be supported at, on or in the wearer's ear, a processor coupled to memory, a radio frequency transceiver coupled to the processor, and an antenna arrangement disposed in or on the housing and coupled to the transceiver and the processor. The antenna arrangement comprises an antenna coupled to a phase shifter. The processor is configured to adjust a phase shift of the phase shifter. The system also comprises a clock synchronization link between the transceivers, a second link configured to communicate received signal information between the transceivers, and a master processor defined by the processor of the first or second hearing device. The master processor is configured to cause the first and second hearing devices to operate the antenna arrangements as a phased array antenna arrangement in a coherent transmit mode by phase-locking the transceivers via the clock synchronization link and operate the antenna arrangements as the phased array antenna arrangement in a coherent receive mode by phase-locking local oscillators of the transceivers via the clock synchronization link and the second link.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
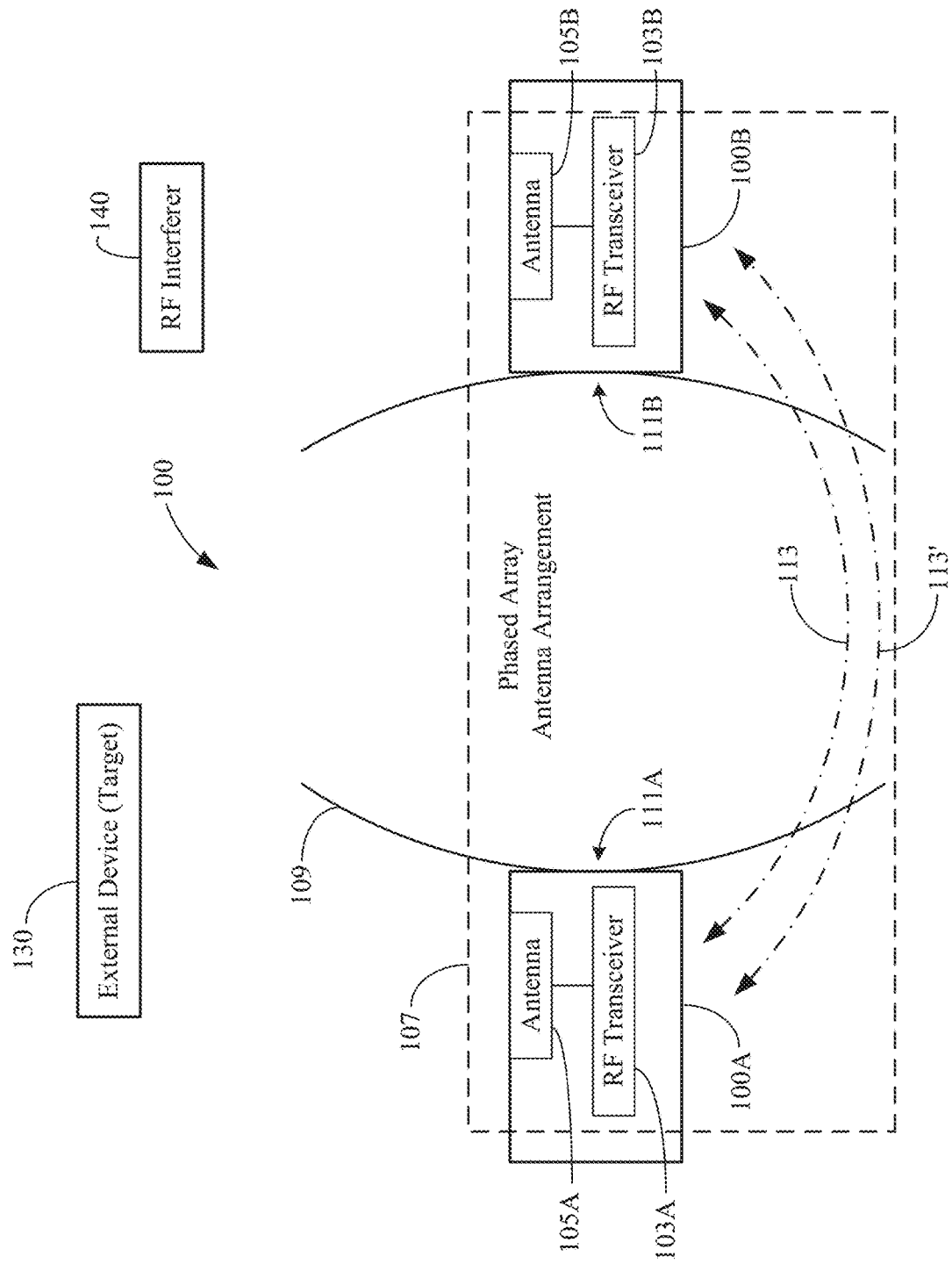
FIG. 1A illustrates a hearing device system comprising first and second hearing devices whose antennas form a phased array antenna arrangement in accordance with any of the embodiments disclosed herein.

It is understood that the embodiments described herein may be used with any ear-worn electronic hearing device without departing from the scope of this disclosure. The devices depicted in the figures are intended to demonstrate the subject matter, but not in a limited, exhaustive, or exclusive sense. Ear-worn electronic hearing devices (referred to herein as "hearing devices"), such as hearables (e.g., wearable earphones, ear monitors, and earbuds), hearing aids, and hearing assistance devices, typically include an enclosure, such as a housing or shell, within which internal components are disposed. Typical components of a hearing device can include a digital signal processor (DSP), memory, power management circuitry, one or more communication devices (e.g., a radio, a near-field magnetic induction (NFMI) device), one or more antennas, one or more microphones, and a receiver/speaker, for example. Hearing devices can incorporate a long-range communication device, such as a Bluetooth® transceiver or other type of radio frequency (RF) transceiver. A communication device (e.g., a radio or NFMI transceiver) of a hearing device can be configured to facilitate communication between a left ear device and a right ear device of the hearing device.

Individual hearing devices of the present disclosure which together define a hearing device system can incorporate a single antenna or a phased array antenna arrangement coupled to a high-frequency transceiver, such as a 2.4 GHz radio. The RF transceiver can conform to an IEEE 802.11 (e.g., WiFi®) or Bluetooth® (e.g., BLE, Bluetooth® 4. 2 or 5.0) specification, for example. It is understood that hearing devices of the present disclosure can employ other transceivers or radios, such as a 900 MHz radio. Hearing devices of the present disclosure can be configured to receive streaming audio (e.g., digital audio data or files) from an electronic or digital source. Representative electronic/digital sources (e.g., accessory devices) include an assistive listening system, a TV streamer, an audio player, a radio, a smartphone, a laptop, a cell phone/entertainment device (CPED) or other electronic device that serves as a source of digital audio data or other types of data files. Hearing devices of the present disclosure can be configured to effect bi-directional communication (e.g., wireless communication) of data with an external source, such as a remote server via the Internet or other communication infrastructure.

The term hearing device of the present disclosure refers to a wide variety of ear-level electronic devices that can aid a person with impaired hearing. The term hearing device also refers to a wide variety of devices that can produce processed sound for persons with normal hearing. Hearing devices of the present disclosure include hearables (e.g., wearable earphones, headphones, earbuds, virtual reality headsets), hearing aids (e.g., hearing instruments), cochlear implants, and bone-conduction devices, for example. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above.

Embodiments of the disclosure are directed to a hearing device system comprising a pair of hearing devices, each of which incorporates a radio frequency (RF) transceiver coupled to at least one antenna. The two hearing devices are configured such that their antennas operate cooperatively as a phased array antenna arrangement. The phased array antenna arrangement defined by the combined antennas of the pair of hearing devices is configured to electronically steer an antenna array pattern of the phased array antenna arrangement in a direction that improves a wireless link between the hearing devices and an external device or system. The term antenna array pattern refers to a radiation pattern of a phase array antenna arrangement. In some cases, the phased array antenna arrangement is controlled to electronically steer a main beam or main lobe of the antenna array pattern towards the best position for the wireless link. In other cases, the phased array antenna arrangement is controlled to electronically steer a null of the antenna array pattern towards a source of interference, thereby improving the wireless link between the hearing devices and a target external device or system. For example, a null of the antenna array pattern can be steered in a direction of a radio frequency noise source or a multipath null contributor. In some cases, the phased array antenna arrangement is controlled to electronically steer both a main beam or lobe and a null of the antenna array pattern towards the best positions for the wireless link.

With increasing numbers of collocated devices utilizing technology in the 2.4 GHz ISM frequency band, it is increasingly likely that the wireless link between a hearing device system and another device will be impacted by these external sources. By steering the antenna array pattern of the hearing device system, the wireless link between the hearing device system and other device can be improved. For example, hearing aids, hearables, wireless headsets, automobile/smartphone links, and WiFi®, all extensively use the 2.4 GHz ISM frequency band. By way of further example, a single in-band WiFi® transmitter due to its large bandwidth of up to 40 MHz is likely to cause interference to hearing devices (e.g., hearing instruments, hearing aids) using the 83.5 MHz wide ISM band. Additionally, even if not directly on-channel, large high-power access points and nearby Bluetooth® users risk overloading the relatively low-power receivers in hearing devices (e.g., hearing aids). In addition to these interference sources, LTE cellphone bands 7, 40, and 41 are allocated for operation just below and above the 2.4 GHz ISM band. These interferers can run even more power, with SAW filtering unable to provide sufficient selectivity to reject this type of interference. This out-of-band interference can significantly desensitize the 2.4 GHz receivers of a hearing device system. Steering the antenna pattern null to the source of maximum interference can keep the hearing device's receiver from being desensi-tized due to the finite interference rejection of a low power receiver. The antenna pattern may need to be steered/adjusted on a per-frequency/per-channel basis for frequency hopped/agile systems due to propagation being frequency dependent (e.g., due to multipath, etc.).

Typically, an antenna array is designed with multiple antennas in the same device. The present disclosure describes implementations of an antenna array with the antennas distributed across multiple discrete devices. As such, the hardware implementation of a hearing device system as disclosed herein is able to utilize the entire size of the device for the antenna. As the antenna performance is highly dependent on electrical size, utilizing the entire size of the hearing device for the antenna eliminates the need for high dielectric materials. This also allows for antenna arrays to be implemented in custom or in-ear hearing devices, where fitting a single antenna is already a challenge and there is no space for a second antenna. Additionally, the spatial/electrical separation of each of the two (independent) antenna elements in the antenna array may be a relatively large percentage of a wavelength at the frequency of operation due to each antenna being separated by approximately a human head width.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1

A hearing device system comprising a first hearing device and a second hearing device adapted to be worn at first and second ears of a wearer, the system comprising a first hearing device and a second hearing device each comprising a housing configured to be supported at, on or in the wearer's ear, a processor coupled to memory, the processor and memory disposed in the housing, a radio frequency transceiver coupled to the processor and disposed in the housing, and an antenna arrangement disposed in or on the housing and coupled to the transceiver and the processor, the antenna arrangement comprising an antenna coupled to a phase shifter, the processor configured to adjust a phase shift of the phase shifter. The system also includes a clock synchronization link between the transceivers, a second link configured to communicate received signal information between the transceivers, and a master processor defined by the processor of the first or second hearing device, the master processor configured to cause the first and second hearing devices to operate the antenna arrangements as a phased array antenna arrangement via the clock synchronization link and the second link.

Example Ex2

The hearing device system according to Ex1, wherein the master processor is configured to coordinate adjustment of the phase of the phase shifters to steer an antenna array pattern of the phased array antenna arrangement.

Example Ex3

The hearing device system according to Ex2, wherein the master processor is configured adjust the phase of the phase shifters to steer a main lobe of the antenna array pattern in a direction of a desired radio frequency signal source that increases or maximizes a signal-to-noise ratio of a radio frequency signal received from the radio frequency signal source.

Example Ex4

The hearing device system according to Ex2 or Ex3, wherein the master processor is configured to steer a main lobe of the antenna array pattern in a direction that increases or maximizes a signal-to-noise ratio of a received radio frequency signal on a per channel frequency basis.

Example Ex5

The hearing device system according to one or more of Ex2 to Ex4, wherein the master processor is configured to steer the antenna array pattern in a direction that increases or maximizes a signal-to-noise ratio of a received radio frequency signal while concurrently nulling a radio frequency noise source or a multipath null contributor.

Example Ex6

The hearing device system according to one or more of Ex1 to Ex5, wherein the memory is configured to store phase parameters tabularized as a function of spatial steering direction, and the processor is configured to adjust the phase shift of each of the phase shifters by sequentially applying the tabularized phase parameters.

Example Ex7

The hearing device system according to Ex6, wherein the phase parameters stored in the memory account for head-loading effects on the antenna array pattern.

Example Ex8

The hearing device system according to one or more of Ex1 to Ex7, wherein the transceiver and the antenna arrangement are configured to transmit and receive radio frequency signals within a 2.4 GHz ISM frequency band.

Example Ex9

The hearing device system according to one or more of Ex1 to Ex8, wherein the antenna arrangements of the first and second hearing devices comprise first and second phased array antenna arrangements, the first and second phased array antenna arrangements comprise a plurality of antennas each coupled to one of a plurality of phase shifters, and the master processor is configured to cause the first and second hearing devices to operate the first and second phased array antenna arrangements as the phased array antenna arrangement.

Example Ex10

A hearing device system comprising a first hearing device and a second hearing device adapted to be worn at first and second ears of a wearer, the system comprising a first hearing device and a second hearing device each comprising a housing configured to be supported at, on or in the wearer's ear, a processor coupled to memory, the processor and memory disposed in the housing, a radio frequency transceiver coupled to the processor and disposed in the housing, and an antenna arrangement disposed in or on the housing and coupled to the transceiver and the processor, the antenna arrangement comprising an antenna coupled to a phase shifter and a variable gain amplifier, the processor configured to adjust a phase shift of the phase shifter and adjust a gain of the variable gain amplifier. The system includes a clock synchronization link between the transceivers, a second link configured to communicate received signal information between the transceivers, and a master processor defined by the processor of the first or second hearing device, the master processor configured to cause the first and second hearing devices to operate the antenna arrangements as a phased array antenna arrangement via the clock synchronization link and the second link.

Example Ex11

The hearing device system according to Ex10, wherein the master processor is configured to coordinate adjustment of the phase of the phase shifters to steer an antenna array pattern of the phased array antenna arrangement, and adjust a gain of the variable gain amplifier to one or more of reduce a side lobe of the antenna array pattern, change a location of the side lobe, and adjust a width of a main lobe of the antenna array pattern.

Example Ex12

The hearing device system according to Ex11, wherein the master processor is configured adjust the phase of the phase shifters to steer a main lobe of the antenna array pattern in a direction of a desired radio frequency signal source that increases or maximizes a signal-to-noise ratio of a radio frequency signal received from the radio frequency signal source.

Example Ex13

The hearing device system according to Ex11 or Ex12, wherein the master processor is configured to steer a main lobe of the antenna array pattern in a direction that increases or maximizes a signal-to-noise ratio of a received radio frequency signal on a per channel frequency basis.

Example Ex14

The hearing device system according to one or more of Ex11 to Ex13, wherein the master processor is configured to steer the antenna array pattern in a direction that increases or maximizes a signal-to-noise ratio of a received radio frequency signal while concurrently nulling a radio frequency noise source or a multipath null contributor.

Example Ex15

The hearing device system according to one or more of Ex10 to Ex 14, wherein the memory is configured to store phase parameters and gain parameters tabularized as a function of spatial steering direction, and the master processor is configured to adjust the phase shift of each of the phase shifters and a gain of each of the variable gain amplifiers by sequentially applying the tabularized phase and gain parameters.

Example Ex16

The hearing device system according to Ex15, wherein the phase and gain parameters stored in the memory account for head-loading effects on the antenna array pattern.

Example Ex17

The hearing device system according to one or more of Ex10 to Ex16, wherein the transceiver and the antenna arrangement are configured to transmit and receive radio frequency signals within a 2.4 GHz ISM frequency band.

Example Ex18

A method implemented by a hearing device system comprising a first hearing device and a second hearing device each adapted to be worn at, on or in an ear of a wearer, the method comprising providing, at the first and second hearing devices, an antenna arrangement coupled to a radio frequency transceiver and a processor, the antenna arrangement comprising an antenna coupled to a phase shifter, adjusting a phase shift of the phase shifters by the processors of the first and second hearing devices, and causing the first and second hearing devices to operate the antenna arrangements as a phased array antenna arrangement by a master processor defined by the processor of the first or second hearing device.

Example Ex19

The method according to Ex18, comprising steering, under control of the master processor, a main lobe of an antenna array pattern of the phased array antenna arrangement in a direction that increases or maximizes a signal-to-noise ratio of a received radio frequency signal.

Example Ex20

The method according to Ex18, comprising steering, under control of the master processor, a main lobe of an antenna array pattern of the phased array antenna arrangement in a direction that increases or maximizes a signal-to-noise ratio of a received radio frequency signal on a per channel frequency basis.

Example Ex21

The method according to Ex18, comprising steering, under control of the master processor, a main lobe of an antenna array pattern of the phased array antenna arrangement in a direction that increases or maximizes a signal-to-noise ratio of a received radio frequency signal while concurrently nulling a radio frequency noise source or a multipath null contributor.

Example Ex22

The method according to one or more of Ex18 to Ex21, wherein the antenna arrangements each comprise a variable gain amplifier coupled to the phase shifter and the antenna, and the method comprises adjusting, under control of the master processor, the phase shift of each of the phase shifters to steer an antenna array pattern of the phased array antenna arrangement, and adjusting, under control of the master processor, a gain of each of the variable gain amplifiers to one or more of reduce a side lobe of the antenna array pattern, change a location of the side lobe, and adjust a width of a main lobe of the antenna array pattern.

Example Ex23

The method according to one or more of Ex18 to Ex22, comprising transmitting and receiving radio frequency signals communicated on a per channel basis via the phased array antenna arrangement.

Example Ex24

A hearing device system comprising a first hearing device and a second hearing device adapted to be worn at first and second ears of a wearer, the system comprising a first hearing device and a second hearing device each comprising a housing configured to be supported at, on or in the wearer's ear, a processor coupled to memory, the processor and memory disposed in the housing, a radio frequency transceiver coupled to the processor and disposed in the housing, and an antenna arrangement disposed in or on the housing and coupled to the transceiver and the processor, the antenna arrangement comprising an antenna coupled to a phase shifter, the processor configured to adjust a phase shift of the phase shifter. The system includes a clock synchronization link between the transceivers, and a master processor defined by the processor of the first or second hearing device, the master processor configured to cause the first and second hearing devices to operate the antenna arrangements as a phased array antenna arrangement in a coherent transmit mode by phase-locking the transceivers via the clock synchronization link.

Example Ex25

The hearing device system according to Ex24, wherein, for each of the first and second hearing devices, the antenna is coupled to the phase shifter and a variable gain amplifier, and the processor is configured to adjust the phase shift of the phase shifter and adjust a gain of the variable gain amplifier.

Example Ex26

A hearing device system comprises a first hearing device and a second hearing device adapted to be worn at first and second ears of a wearer, the system comprising a first hearing device and a second hearing device each comprising a housing configured to be supported at, on or in the wearer's ear, a processor coupled to memory, the processor and memory disposed in the housing, a radio frequency transceiver coupled to the processor and disposed in the housing, and an antenna arrangement disposed in or on the housing and coupled to the transceiver and the processor, the antenna arrangement comprising an antenna coupled to a phase shifter, the processor configured to adjust a phase shift of the phase shifter. The system includes a clock synchronization link between the transceivers, a second link configured to communicate received signal information between the transceivers, and a master processor defined by the processor of the first or second hearing device, the master processor configured to cause the first and second hearing devices to operate the antenna arrangements as a phased array antenna arrangement in a coherent receive mode by phase-locking local oscillators of the transceivers via the clock synchronization link and the second link.

Example Ex27

The hearing device system according to Ex26, wherein for each of the first and second hearing devices, the antenna is coupled to the phase shifter and a variable gain amplifier, and the processor is configured to adjust the phase shift of the phase shifter and adjust a gain of the variable gain amplifier.

Example Ex28

A hearing device system comprising a first hearing device and a second hearing device adapted to be worn at first and second ears of a wearer, the system comprising a first hearing device and a second hearing device each comprising a housing configured to be supported at, on or in the wearer's ear, a processor coupled to memory, the processor and memory disposed in the housing, a radio frequency transceiver coupled to the processor and disposed in the housing, and an antenna arrangement disposed in or on the housing and coupled to the transceiver and the processor, the antenna arrangement comprising an antenna coupled to a phase shifter, the processor configured to adjust a phase shift of the phase shifter. The system includes a clock synchronization link between the transceivers, a second link configured to communicate received signal information between the transceivers, and a master processor defined by the processor of the first or second hearing device, the master processor configured to cause the first and second hearing devices to operate the antenna arrangements as a phased array antenna arrangement in a coherent transmit mode by phase-locking the transceivers via the clock synchronization link, and operate the antenna arrangements as the phased array antenna arrangement in a coherent receive mode by phase-locking local oscillators of the transceivers via the clock synchronization link and the second link.

Example Ex29

The hearing device system according to Ex28, wherein for each of the first and second hearing devices the antenna is coupled to the phase shifter and a variable gain amplifier, and the processor is configured to adjust the phase shift of the phase shifter and adjust a gain of the variable gain amplifier.

FIG. 1A illustrates a hearing device system 100 adapted to be worn at left and right ears 111A, 111B of a wearer's head 109. The hearing device system 100 includes a left hearing device 100A supported at, on or in the wearer's left ear 111A, and a right hearing device 100B supported at, on or in the wearer's right ear 111B. Among other components, the left and right hearing devices 100A, 100B include an RF transceiver 103A, 103B operably coupled to at least one antenna 105A, 105B. Although single antennas 105A, 105B are shown in FIG. 1A, it is understood that the left and right hearing devices 100A, 100B can include a multiplicity of antennas.

The RF transceivers 103A, 103B are configured to be synced together via a communication link 113 (e.g., a clock synchronization link) which enables the antennas 105A, 105B of the left and right hearing devices 100A, 100B to operate cooperatively as a phased array antenna arrangement 107. A second link 113' is used to communicate received signal information between the RF transceivers 103A, 103B during a receive mode. The received signal information link 113' can be a continuous link (present during transmit and receive modes) or a discontinuous link (present only during the receive mode). In some implementations, one or both of the clock synchronization link 113 and the received signal information link 113' can be a non-RF link (e.g., a non-BLE link), such as a magnetic link (e.g., an NFMI link). In other implementations, one or both of the clock synchronization link 113 and the received signal information link 113' can be an RF link that uses a frequency different from that used by the RF transceivers 103A, 103B. The phased array antenna arrangement 107 comprises antenna 105A of hearing device 100A and antenna 105B of hearing device 100B which together cooperate to create a beam of radio waves that can be electronically steered to point in a desired direction (e.g., towards a target external device 130) without moving the antennas 105A, 105B. It is understood that the phased array antenna arrangement 107 includes other components of the left and right hearing devices 100A, 100B, including RF transceivers 103A, 103B, clock synchronization link 113, and received signal information link 113'. The antennas 105A, 105B can also be electronically steered to point in a desired direction when receiving radio waves from an external source 130 or to avoid external sources of interference 140.

Figure 1B:
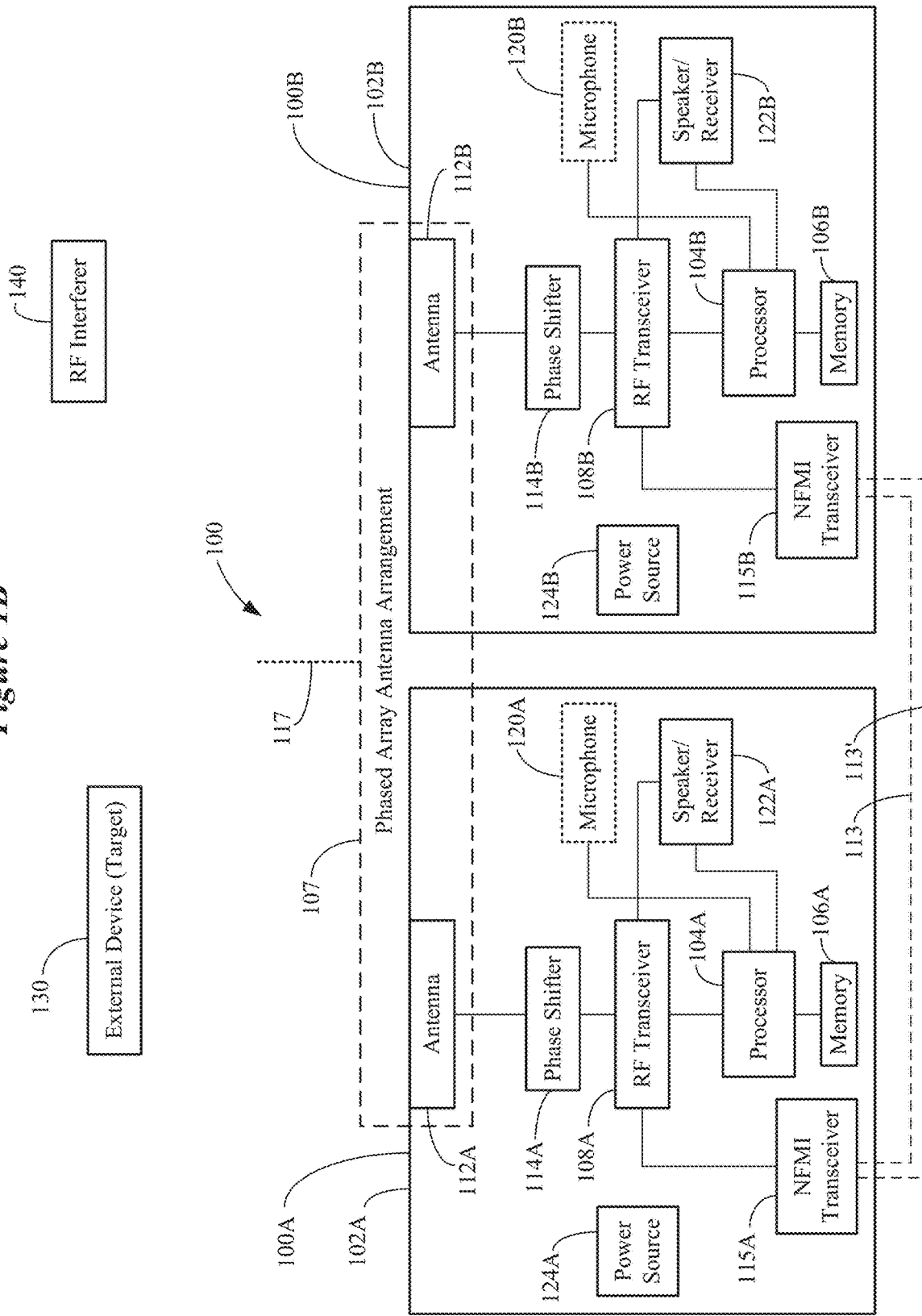
FIG. 1B illustrates a hearing device system comprising first and second hearing devices whose antennas form a phased array antenna arrangement in accordance with any of the embodiments disclosed herein.

FIG. 1B illustrates a hearing device system 100 comprising a first hearing device 100A and a second hearing device 100B each adapted to be worn at, on or in an ear of a wearer in accordance with any of the embodiments disclosed herein. Each hearing device 100A, 100B shown in FIG. 1B includes a housing 102A, 102B configured to be supported at, on or in the wearer's ear. Disposed within the housing 102A, 102B is a processor 104A, 104B coupled to memory 106A, 106B. The processor 104A, 104B can include or be implemented as a multi-core processor, a DSP, an audio processor or a combination of these processors. In some embodiments, the hearing device 100A, 100B includes a microphone 120A, 120B mounted in or on the housing 102A, 102B, which can be a single microphone or multiple microphones (e.g., a microphone array). The microphone 120A, 120B can be coupled to a preamplifier (not shown), the output of which is coupled to the processor 104A, 104B via an analog front end. A speaker or receiver 122A, 122B of the hearing device 100A, 100B is coupled to an amplifier (not shown) and the processor 104A, 104B. The speaker or receiver 122A, 122B is configured to generate sound which is communicated to the wearer's ear. A power source 124A, 124B, such as a rechargeable battery, provides power for the components of the hearing device 100A, 100B.

A radio frequency transceiver 108A, 108B is coupled to the processor 104A, 104B and disposed in the housing 102A, 102B. An antenna 112A, 112B is disposed in and/or on the housing 102A, 102B and coupled to the RF transceiver 108A, 108B via a phase shifter 114A, 114B. The antennas 112A, 112B may be implemented according to any antenna topology (e.g., bowtie, dipole, patch, PIFA, chip). As will be described below in greater detail, the processors 104A, 104B are configured to cooperatively adjust a phase shift of the phase shifters 114A, 114B to facilitate electronic steering of an antenna array pattern of the phased array antenna arrangement 107 comprising antennas 112A, 112B. It is understood that, in addition to antennas 112A, 112B, the phased array antenna arrangement 107 shown in FIG. 1B includes other components of the left and right hearing devices 100A, 100B, including RF transceivers 108A, 108B, phase shifters 114A, 114B, and clock synchronization link 113 and received signal information link 113' supported by resident NFMI transceivers 115A, 115B or functionally equivalent communications (referred to herein collectively as NFMI transceivers).

Figure 1E:
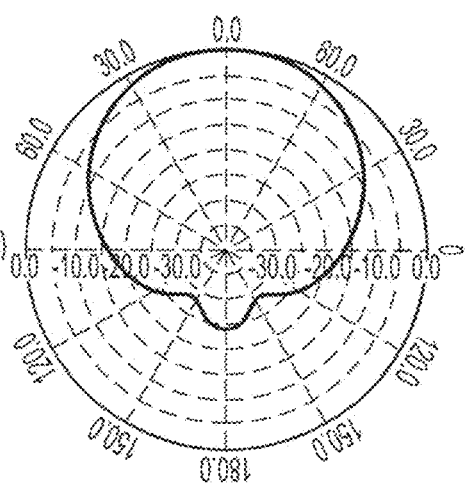
FIG. 1E shows a representative antenna pattern on the elevation plane.
Figure 1D:
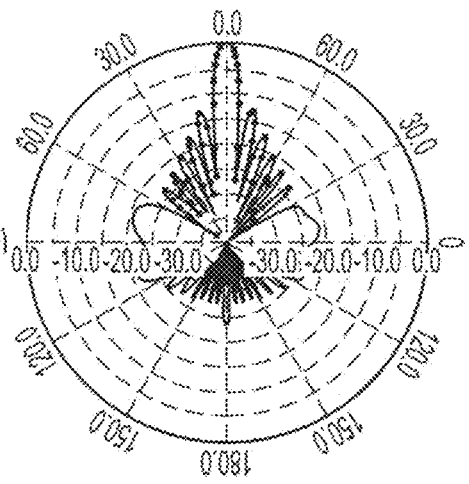
FIG. 1D shows a representative antenna pattern on the azimuth plane.
Figure 1C:
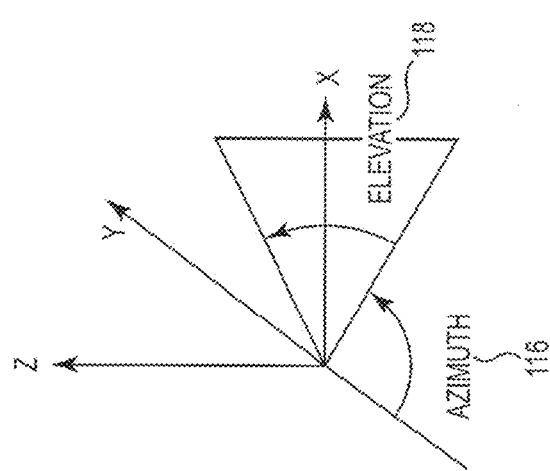
FIG. 1C illustrates that an antenna array pattern of a phased array antenna arrangement can be electronically steered in one or both of an azimuth plane and an elevation plane in accordance with any of the embodiments disclosed herein.

The processors 104A, 104B are configured to cooperatively adjust the phase shift of the phase shifters 114A, 114B to electronically steer the antenna array pattern in one or both of an azimuth plane 116 and an elevation plane 118 as shown in FIG. 1C. The antenna array pattern can be steered when the phased array antenna arrangement 107 operates in a transmit mode and in a receive mode. In some embodiments (see, e.g., FIGS. 3A and 3B), the hearing devices 102A, 102B include a multiplicity of antennas 112A, 112B and a corresponding multiplicity of phase shifters 114A, 114B. In such embodiments, the processors 104A, 104B are configured to cooperatively adjust the phase shift of each of the multiplicity of phase shifters 114A, 114B to facilitate electronic steering of the antenna array pattern.

Each of the radio frequency transceivers 108A, 108B is coupled to an NFMI transceiver 115A, 115B. The NFMI transceivers 115A, 115B support a clock synchronization link 113 and a received signal information link 113' (e.g., a high frequency magnetic link) between the RF transceivers 108A, 108B. The clock synchronization link 113 facilitates synchronization between the RF transceivers 108A, 108B needed to operate antennas 112A, 112B cooperatively as a phased array antenna arrangement 107. More particularly, the clock synchronization link 113 allows the synthesizers of the RF transceivers 108A, 108B (e.g., synthesizers of BLE transceivers) to be phase-locked to provide for coherent transmission, and the received signal information link 113' is provided for the local oscillators in receive mode. The clock synchronization link 113 and the received signal information link 113' also enables the transceiver synthesizers to modify the phase output between the two RF transceivers 108A, 108B. This allows for the overall radiation pattern of the phased array antenna arrangement 107 to be shifted based on the phase shift between the two RF transceivers 108A, 108B. This also enables the output powers of each hearing device 100A, 100B to be modified coherently as well, which can also impact the overall radiation pattern of the phased array antenna arrangement 107. This is especially useful for steering a null of the phased array antenna arrangement 107.

According to any of the embodiments disclosed herein, one of the hearing devices (e.g., hearing device 100A) serves as a master and the other hearing device (e.g., hearing device 100B) serves as a slave. In such embodiments, one of the processors 104A, 104B is configured to control phase shift adjustments of the phase shifters 114A, 114B to steer the overall radiation pattern of the phased array antenna arrangement 107. The clock synchronization link 113 between the two hearing devices 100A, 100B is used to communicate the coherent receiver output (preferably the Intermediate Frequency-IF) of one receiver (e.g., the receiver of RF transceiver 108A) to the second receiver (e.g., the receiver of RF transceiver 108B). The clock synchronization link 113 can be implemented using NFMI on a separate channel from the reference clock information, for example. The two receiver outputs can then be coherently combined prior to detection/demodulation to effectively function as one receiver coupled to the phased array antenna arrangement 107 defined by antennas 112A, 112B. The phase shifting can be done at the IF level if desired.

Figure 1F:
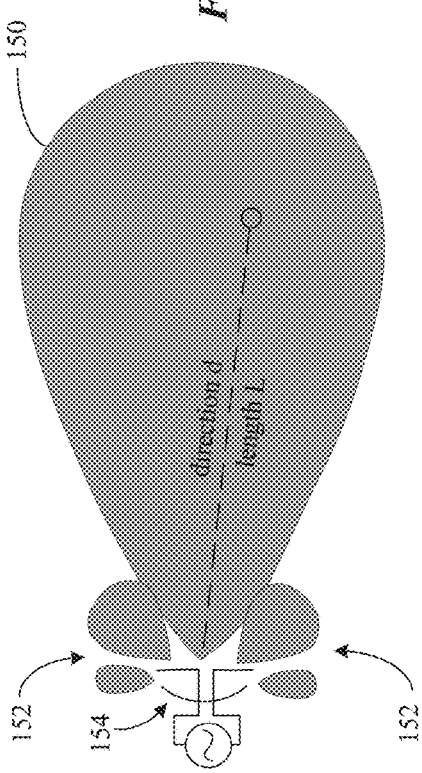
FIG. 1F shows a representative antenna pattern which includes a main lobe, side lobes, and a null.

As was previously discussed, the antennas 112A, 112B can also be electronically steered to point in a desired direction when receiving radio waves from an external source 130 or to avoid external sources of interference 140. In a transmit mode, radio frequency current generated by the RF transceivers 108A, 108B is fed to the antennas 112A, 112B with the correct phase relationship via the phase shifters 114A, 114B so that the radio waves from the separate antennas 112A, 112B add together to increase the radiation in a desired direction, while canceling to suppress radiation in undesired directions. By changing the phase of the phase shifters 114A, 114B, the master processor 104A or 104B can quickly change the angle or angles of the beam and null(s) of the antenna array pattern. For example, the master processor 104A or 104B can adjust the phase of the phase shifters 114A, 114B to cause the antenna array pattern to be directed at a desired angle (e.g., an azimuth angle 116 or an elevation angle 118 shown in FIG. 1C) or angles (an azimuth angle 116 and an elevation angle 118) relative to the axis 117 of the phased array antenna arrangement 107. For purposes of illustration, a representative antenna pattern on the azimuth plane is shown in FIG. 1D. A representative antenna pattern on the elevation plane is shown in FIG. 1E. FIG. 1F shows a representative antenna pattern which includes a main lobe 150 (having a length, L, and direction, d), side lobes 152, and a null 154.

Antenna array pattern nulls are often many tens of dB, whereas peaks in antenna gain are often several dB above the average antenna gain. In environments with one or more high-power sources of RF interference 140, it may be advantageous to steer the antenna null toward one of these RF interferers 140, rather than steering the beam toward the external target device 130. Steering the antenna null toward one of these RF interferers 140 can substantially improve the signal-to-noise (SNR) ratio of the wireless link (e.g., 2.4 GHz link) with the external target device 130. Generally, however, a steering methodology that involves a combination of steering the antenna null toward an RF interferer 140 and steering the beam toward the external target device 130 (with the weighting toward reducing the noise over increasing the desired signal) is particularly useful in scenarios where the noise level is quite high.

In environments with minimal RF interference, the antenna array pattern of the phased array antenna arrangement 107 can be steered such that the beam is directed toward the external target device 130 to increase (e.g., optimize) the SNR of the wireless link with the external target device 130. The external target device 130 can be a device in the wearer's pocket (e.g., an ear-to-pocket wireless link) or an off-body accessory (e.g., an ear-to-off body wireless link). An improvement in SNR can allow lowering of the hearing devices' transmitter power, which can significantly reduce current drain, extend battery life, and/or provide for a more robust wireless link for a given transceiver power level.

Figure 2:
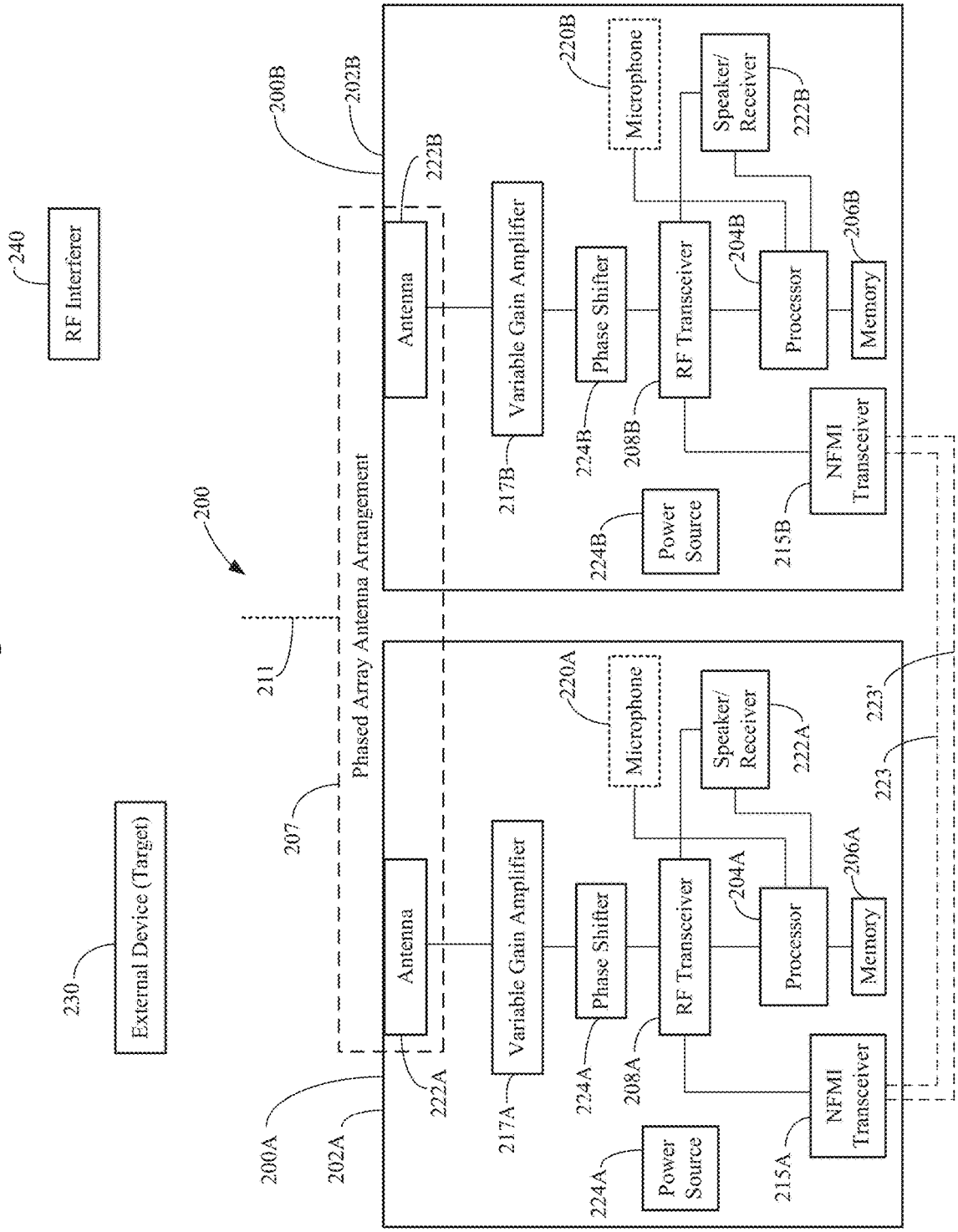
FIG. 2 illustrates a hearing device system comprising first and second hearing devices whose antennas form a phased array antenna arrangement in accordance with any of the embodiments disclosed herein.

FIG. 2 illustrates a hearing device system 200 comprising a first hearing device 200A and a second hearing device 200B each adapted to be worn at, on or in an ear of a wearer in accordance with any of the embodiments disclosed herein. Each hearing device 200A, 200B shown in FIG. 2 includes a housing 202A, 202B configured to be supported at, on or in the wearer's ear. Disposed in the housing 202A, 202B is a processor 204A, 204B coupled to memory 206A, 206B. According to any of the embodiments disclosed herein, one of the hearing devices (e.g., hearing device 200A) serves as a master and the other hearing device (e.g., hearing device 200B) serves as a slave. The processor 204A, 204B can include or be implemented as a multi-core processor, a DSP, an audio processor or a combination of these processors. In some embodiments, the hearing device 200A, 200B includes a microphone 220A, 220B, which can be a single microphone or multiple microphones (e.g., a microphone array). The microphone 220A, 220B can be coupled to a preamplifier (not shown), the output of which is coupled to the processor 204A, 204B via an analog front end. A speaker or receiver 222A, 222B is coupled to an amplifier (not shown) and the processor 204A, 204B. The speaker or receiver 222A, 222B is configured to generate sound which is communicated to the wearer's ear. A power source 224A, 224B, such as a rechargeable or conventional battery, provides power for the components of the hearing device 200A, 200B.

A radio frequency transceiver 208A, 208B is coupled to the processor 204A, 204B and disposed in the housing 202A, 202B. An antenna 222A, 222B is disposed in and/or on the housing 202A, 202B and coupled to the RF transceiver 208A, 208B via a phase shifter 224A, 224B and a variable gain amplifier (VGA) 217A, 217B. As previously described, the processors 204A, 204B (typically via a master processor 204A or 204B) are configured to cooperatively adjust a phase shift of the phase shifters 224A, 224B to electronically steer an antenna array pattern of the phased array antenna arrangement 207 defined by antennas 222A, 222B. It is understood that, in addition to antennas 222A, 222B, the phased array antenna arrangement 207 shown in FIG. 2 includes other components of the left and right hearing devices 200A, 200B, including RF transceivers 208A, 208B, phase shifters 224A, 224B, VGAs 217A, 217B, and clock synchronization and received signal information links 223, 223' (described previously) supported by NFMI transceivers 215A, 215B. It is noted that the dashed box labeled phased array antenna arrangement 207 is shown in FIG. 2 to encompass only antennas 222A, 222B for purposes of clarity.

The antenna array pattern can be steered when the phased array antenna arrangement 207 operates in a transmit mode and in a receive mode. In some embodiments (see, e.g., FIGS. 3A and 3B), the hearing devices 202A, 202B include a multiplicity of antennas 222A, 222B and a corresponding multiplicity of phase shifters 224A, 224B and VGAs 217A, 217B. In such embodiments, the processors 204A, 204B (typically via a master processor 204A or 204B) are configured to cooperatively adjust the phase shift of each of the multiplicity of phase shifters 224A, 224B to electronically steer the antenna array pattern.

The processors 204A, 204B (typically via a master processor 204A or 204B) are also configured to cooperatively adjust the gain of the VGAs 217A, 217B to provide for improved phased array antenna performance, as is discussed below.

Each of the radio frequency transceivers 208A, 208B is coupled to an NFMI transceiver 215A, 215B. As previously discussed, the NFMI transceivers 215A, 215B support a clock synchronization link 223 and a received signal information link 223' between the RF transceivers 208A, 208B which facilitates synchronization between the RF transceivers 208A, 208B needed to operate antennas 222A, 222B cooperatively as a phased array antenna arrangement 207 (see discussion above regarding FIG. 1B).

The embodiment shown in FIG. 2 provides for improved phased array antenna performance by using non-uniform excitation amplitudes provided to each of the antennas 222A, 222B by variable gain amplifiers 217A, 217B. In general, the processors 204A, 204B (e.g., as controlled by the master processor 204A or 204B) cooperate with the phase shifters 224A, 224B and the VGAs 217A, 217B to feed variable phase and amplitude to their respective antenna 222A, 222B of the phased array antenna arrangement 207. In some embodiments, the VGAs 217A, 217B are configured to feed antennas 222A, 222B of the phased array antenna arrangement 207 with different power levels. The processors 204A, 204B (e.g., as controlled by the master processor 204A or 204B) can be configured to vary the gain of the VGAs 217A, 217B in a manner which reduces the side lobes of the antenna array pattern, changes the location of the side lobes, and/or changes the beam widths of the side lobes. In addition, or alternatively, the processors 204A, 204B (e.g., as controlled by the master processor 204A or 204B) can be configured to vary the gain of each of the VGAs 217A, 217B to modify the width of the main beam of the antenna array pattern. In addition, or alternatively, the processors 204A, 204B (e.g., as controlled by the master processor 204A or 204B) can be configured to vary the gain of each of the VGAs 217A, 217B to modify the null levels, locations, and widths. In some cases, the VGAs 217A, 217B can have unity gain. In other cases, the VGAs 217A, 217B can provide for attenuation of excitation amplitudes provided to each of the antennas 222A, 222B.

In accordance with any of the embodiments disclosed herein, it may be desirable for the phase shifters 224A, 224B to perform their function at lower amplitudes, with the output of the phase shifters 224A, 224B being amplified by the VGAs 217A, 217B before being feed to each antenna 222A, 222B. If all the gains of the VGAs 217A, 217B were equal (but greater than 1), then this approach would effectively be consistent with the phase-shift only approach shown in FIG. 1B.

Figure 3A:
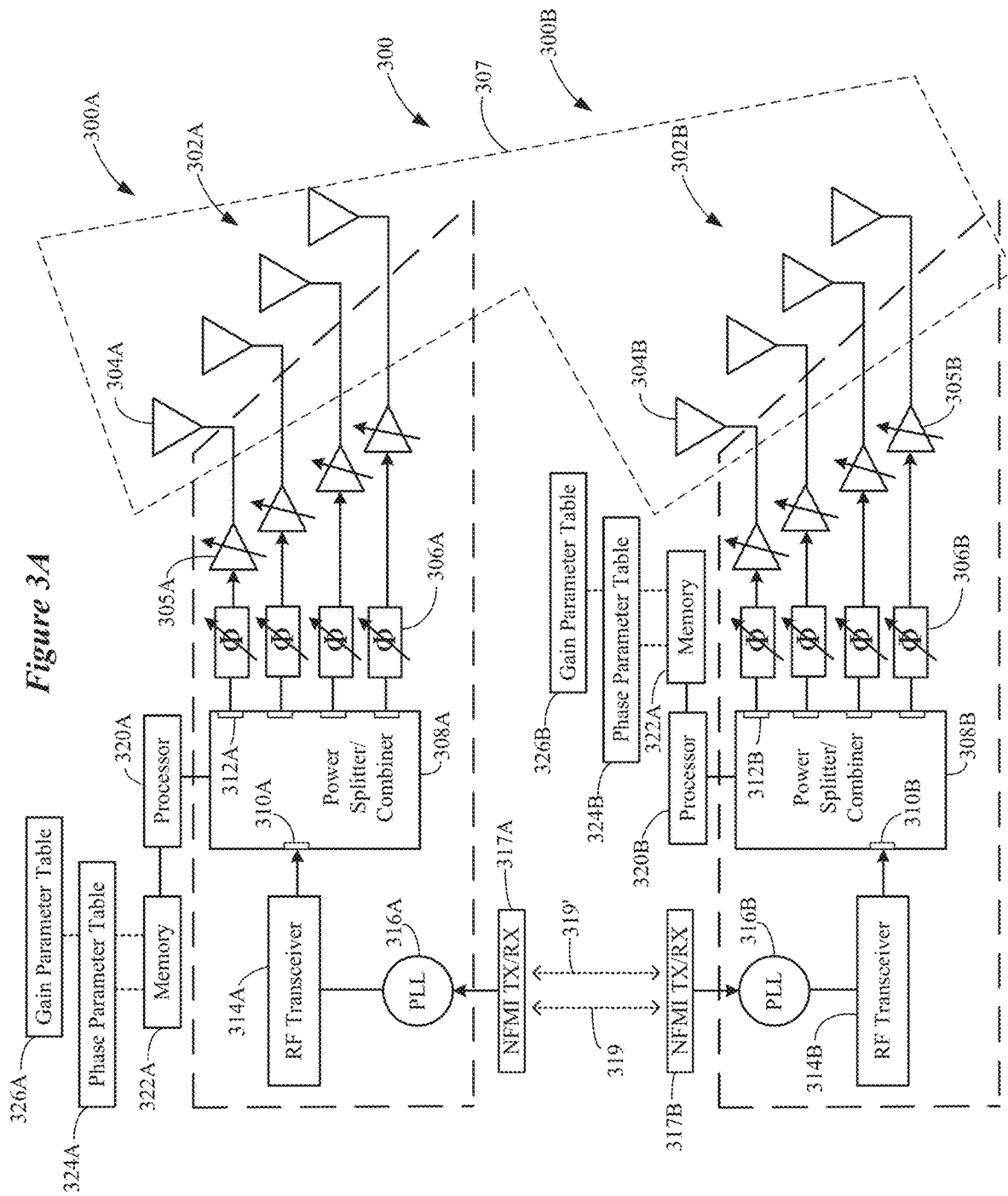
FIGS. 3A and 3B illustrate a hearing device system comprising first and second hearing devices each including a phased array antenna arrangement which, together, are controlled to form a combined phased array antenna arrangement in accordance with any of the embodiments disclosed herein.
Figure 3B:
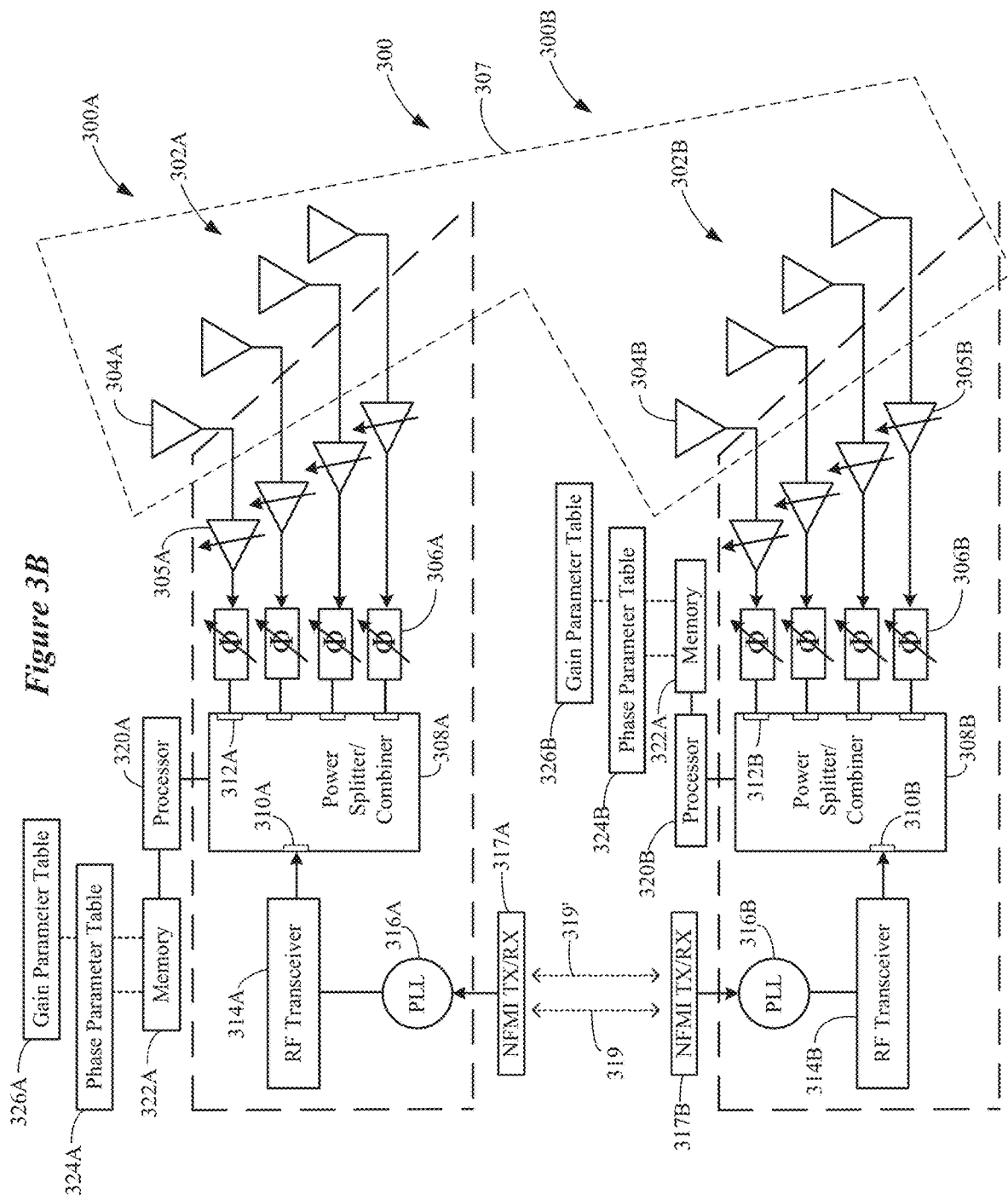

FIGS. 3A and 3B illustrate a hearing device system 300 comprising a first hearing device 300A and a second hearing device 300B each adapted to be worn at, on or in an ear of a wearer in accordance with any of the embodiments disclosed herein. FIG. 3A shows the circuitry in a transmit mode, while FIG. 3B shows the circuitry in a receive mode. Each of the hearing devices 300A, 300B includes a phased array antenna arrangement 302A, 302B. The first and second hearing devices 300A, 300B are configured to cooperate communicatively such that the phased array antenna arrangements 302A, 302B operate as a combined phased array antenna arrangement 307.

It is understood that, in addition to antennas 304A, the phased array antenna arrangement 302A shown in FIGS. 3A and 3B includes other components of the first hearing device 300A, including RF transceiver 314A, power splitter/combiner 308A, phase shifters 306A, and VGAs 305A. It is also understood that, in addition to antennas 304B, the phased array antenna arrangement 302B shown in FIGS. 3A and 3B includes other components of the second hearing device 300B, including RF transceiver 314B, power splitter/combiner 308B, phase shifters 306B, and VGAs 305B. It is noted that the dashed boxes labeled phased array antenna arrangements 302A, 302B are shown in FIGS. 3A and 3B to encompass only antennas 304A, 304B, respectively, for purposes of clarity. The combined phased array antenna arrangement 307 also includes a clock synchronization link 319 and a received signal information link 319' supported by devices 316A, 316B.

The following discussion provides details concerning individual operation of the phased array antenna arrangements 302A, 302B of the first and second hearing devices 300A, 300B. Following this discussion, details are provided concerning the operation of the combined phased array antenna arrangement 307 by cooperation between the first and second hearing devices 300A, 300B.

Each of the phased array antenna arrangements 302A, 302B comprises a plurality of antennas 304A, 304B. Although four antennas 304A, 304B are shown in FIGS. 3A and 3B for illustrative purposes, it is understood that the number of antennas 304A, 304B can vary (e.g., any number of antennas from 2 to 8 antennas). The antennas 304A, 304B can be implemented according to any topology (e.g., bowtie, dipole, patch, PIFA, chip). Each of the antennas 304A, 304B is coupled to a VGA 305A, 305B, and each VGA 305A, 305B is coupled to a phase shifter 306A, 306B. As was discussed previously, non-uniform excitation amplitudes can be provided to each of the antennas 304A, 304B by controlling the gain of individual VGAs 305A, 305B by the processor 320A, 320B. In some cases, the VGAs 305A, 305B can have unity gain. In other cases, the VGAs 305A, 305B can provide for attenuation of excitation amplitudes provided to each of the antennas 304A, 304B. It is noted that, according to some embodiments, the transceiver/antenna circuitry of the first and second hearing devices 300A, 300B can exclude the VGAs 305A, 305B (see, e.g., FIG. 1B).

A power splitter/combiner 308A, 308B includes a first port 310A, 310B coupled to an RF transceiver 314A, 314B and a plurality of second ports 312A, 312B. The power splitter/combiner 308A, 308B can be a Wilkinson power splitter/combiner/divider, for example. Each of the second ports 312A, 312B is coupled to a corresponding phase shifter 306A, 306B. The RF transceiver 314A, 314B is coupled to a reference clock 316A, 316B, such as a phase lock loop. The RF transceiver 314A, 314B can be configured to operate in the 2.4 GHz band.

Each of the phase shifters 306A, 306B and VGAs 305A, 305B is coupled to a processor 320A, 320B. The phase of the phase shifters 306A, 306B and the gain of the VGAs 305A, 305B are controlled by the processor 320A, 320B. Each of the processors 320A, 320B is coupled to a memory 322A, 322B configured to support a phase parameter table 324A, 324B and a gain parameter table 326A, 326B. Phase and gain parameters can be tabularized and stored electronically as a function of desired spatial steering direction in the phase parameter table 324A, 324B and the gain parameter table 326A, 326B. For example, in a linear, uniformly excited array, the main beam can be steered away the perpendicular "broadside" pattern by the same angle as the phase delay. So, if each antenna from left to right has a delay of 30 degrees, for example, the antenna array pattern will move 30 degrees down to the right. A phased-weighting scheme can be implemented by the processors 320A, 320B to steer the antenna array pattern such that the direction of maximum reception is in a desired direction.

In some embodiments, the phase and gain parameters stored in the phase parameter table 324A, 324B and the gain parameter table 326A, 326B can account for head-loading effects (e.g., of an average head) on the antenna array pattern. It is known that an antenna can be substantially affected by the presence of human tissue, which may degrade the antenna performance. The presence of human tissue can also reduce the efficiency of an antenna. Such effect is known as head loading and can make the performance of the antenna when the hearing device is worn (referred to as "on head performance") substantially different from the performance of the antenna when the hearing device is not worn. The phase parameters stored in the phase parameter table 324A, 324B that account for head-loading effects on the antenna array pattern can be determined during development of the hearing device system and/or via a machine learning algorithm that customizes the phase parameters for each user.

The antenna array pattern (main lobe or null) of each phased array antenna arrangement 302A, 302B can be spatially steered by each processor 320A, 320B, which accesses the phase and gain parameters stored in the phase parameter table 324A, 324B and the gain parameter table 326A, 326B. For example, each processor 320A, 320B can be configured to step through tabularized phase and gain parameters sequentially, with the processors 320A, 320B feeding phase parameters to each of phase shifters 306A, 306B and gain parameters to each of the VGAs 305A, 305B. As was discussed previously, the processors 320A, 320B can be configured to feed phase parameters to the phase shifters 306A, 306B to steer the antenna array pattern in a desired direction, and feed gain parameters to the VGAs 305A, 305B to modify the width of the main beam, modify one or more of a magnitude, location, and beam width of the side lobes, and/or modify the null levels, locations, and widths. Various methodologies for steering the antenna array pattern of the phased array antenna arrangements 302A, 302B by the processors 320A, 320B are described hereinbelow.

In some embodiments, the transceiver/antenna circuitry of the first hearing device 300A shown in FIGS. 3A and 3B can be implemented on a single RF IC. Similarly, the transceiver/antenna circuitry of the second hearing device 300B shown in FIGS. 3A and 3B can also be implemented on a single RF IC. Additional details concerning the configuration and operation of the phased array antenna arrangements 302A, 302B are provided in copending U.S. Ser. No. 16/059,779 filed on Aug. 8, 2018, which is incorporated herein by reference.

The following discussion provides details concerning the operation of the combined phased array antenna arrangement 307 by cooperation between the first and second hearing devices 300A, 300B. The processes described below are preferably coordinated by a master processor defined by the processor 320A of the first hearing device 300A or the processor 320B of the second hearing device 300B. The other processor 320A or 320B serves as a slave to the master processor. The first and second hearing device 300A, 300B communicate via a clock synchronization link 319 and a received signal information link 319' to coordinate operation of the phased array antenna arrangements 302A, 302B as the combined phased array antenna arrangement 307 under the control of the master processor 320A or 320B.

According to various embodiments, the RF transceivers 314A, 314B are UHF (ultra-high frequency) transceivers, and the PLLs 316A, 316B are UHF PLLs. Each hearing device 300A, 300B includes an NFMI transceiver (TX/RX) 317A, 317B that cooperate to support an ear-to-ear clock synchronization link 319 and an ear-to-ear received signal information link 319' (e.g., high frequency magnetic links). The clock synchronization link 319 and received signal information link 319' allow the UHF synthesizers of the RF transceivers 314A, 314B to be phase locked to provide for two coherent UHF transmitters and two coherent UHF receivers. Phase-locking the UHF synthesizers of each hearing device's UHF transceiver 314A, 314B to the NFMI transceiver's frequency reference, which in turn has one NFMI transceiver's frequency reference phase-locked to the second NFMI transceiver's frequency reference, leads to two coherent UHF transmitters which may then be used as a distributed phased array antenna/transceiver system.

Just as reciprocity applies to the antenna system (assuming that the direction of the variable gain amplifiers is reversed as shown in FIG. 3B), so too does the phase-locking of the first transceiver's frequency synthesizer(s) to the second transceiver's frequency reference via the NFMI signal sent between the hearing devices 300A, 300B. This technique enables coherent down-conversion of the received signal to be processed, either nearly in real-time via combined processing of received information from the second receiver via the NFMI link 319' or post-processed/non-near-real-time via a similar, time-delayed, flow.

Alternatively, MIMO (Multiple Input/Multiple Output), or alternately Rake-Receiver (at the antenna level), techniques can be used to utilize and/or combat multipath fading.

In the later case, phase and gain adjustments can be made to the received signal from each antenna in the array to effectively coherently add multipath components. This can be done on a per hearing device basis or in combination with the techniques described in the preceding paragraph. It is noted that an additional NFMI "channel" can be included for the Intermediate Frequency of one UHF Receiver (the receiver portion of a transceiver) to be sent to the other hearing device's receiver for coherent combination/processing prior to detection/demodulation.

For an antenna array, the overall pattern is dependent on the distance between the two elements. This is because the wave construction and destruction are dependent on the phase differences (or distances traveled from the sources) between the two waves. Because people have variable head sizes, this distance may need to be calibrated for each person who wears the set of hearing devices. This can be accomplished by using the acoustics capabilities of the hearing device to emit and record an ultrasonic pulse, or by a locking technique that determines the delay using BLE after synchronizing the two hearing devices. The issue with both of these approaches is that the signal does not travel through the head, but around it. This incurs additional delay that may result in an overestimate of the true distance between the two hearing devices. However, it may be possible to not require the distance between devices at all. If a scanning algorithm is designed to sweep phase and amplitude settings until it finds the best setting, this would account for the different distances between antennas.

Figure 3C:
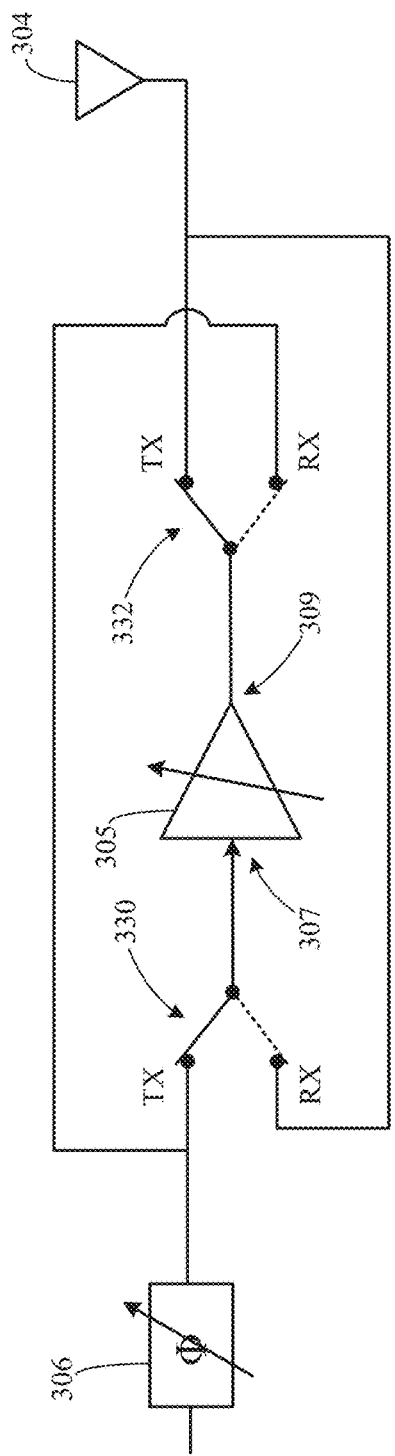
FIG. 3C is a block diagram of a variable gain amplifier shown in FIGS. 3A and 3B with accompanying switching circuitry in accordance with any of the embodiments disclosed herein.

FIG. 3C is a block diagram of a VGA 305 shown in FIGS. 3A and 3B with accompanying switching circuitry in accordance with any of the embodiments disclosed herein. The VGA circuitry shown in FIG. 3C allows the VGA 305 to function in both a transmit mode and a receive mode by the addition of switching circuitry. The switching circuitry includes a first switch 330 coupled to an input 307 of the VGA 305 and a second switch 332 coupled to an output 309 of the VGA 305. The first switch 330 is coupled to a phase shifter 306, and the second switch 332 is coupled to an antenna 304. The first and second switches 330, 332 can be implemented as single-pole-double-throw (SPDT) RF switches. As shown, the first and second switches 330, 332 are set for operation in a transmit mode. In a receive mode, the first and second switches 330, 332 would be set for operation as indicated by the dashed lines.

In a transmit (TX) mode, RF signals pass from the phase shifter 306 to the TX throw of the first switch 330, and from the pole of the first switch 330 to the input 307 of the VGA 305. Variable gain is applied to the RF signals passing through the VGA 305. The RF signals pass from the output 309 of the VGA 305 to the pole of the second switch 332, and from the TX throw of the second switch 332 to the antenna 304. In the receive (RX) mode, RF signals are communicated from the antenna 304 to the RX throw of the first switch 330, and from the pole of the first switch 330 to the input 307 of the VGA 305. Variable gain is applied to the RF signals passing through the VGA 305. The RF signals pass from the output 309 of the VGA 305 to the pole of the second switch 332, and from the RX throw of the second switch 332 to the phase shifter 306.

Figure 3D:
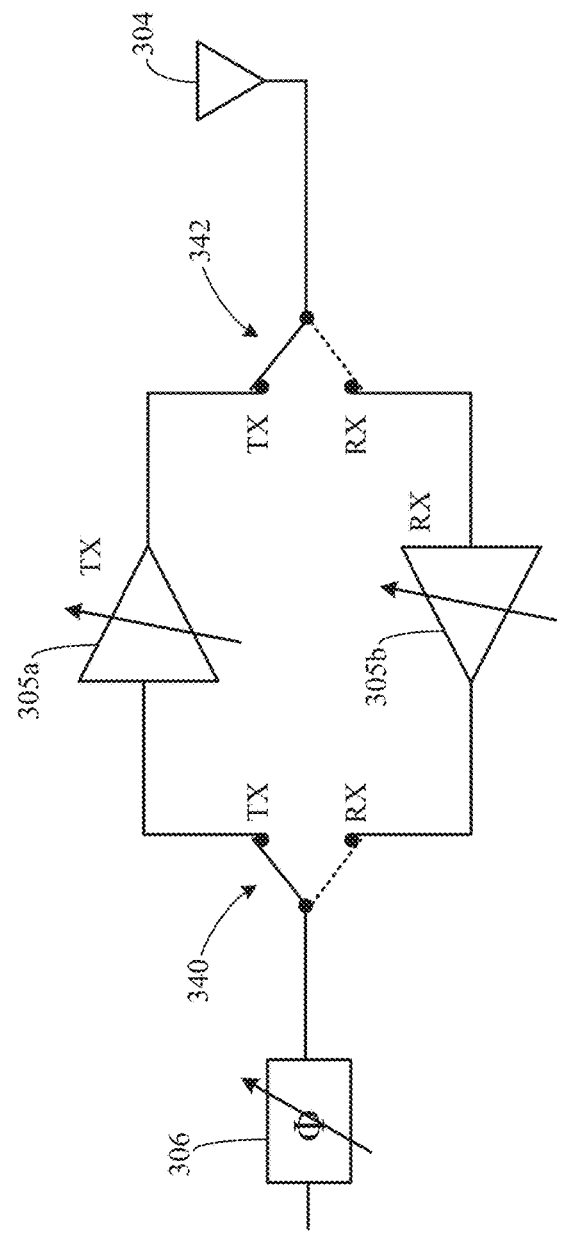
FIG. 3D is a block diagram of a variable gain amplifier arrangement with accompanying switching circuitry for use in the hearing device shown in FIGS. 3A and 3B in accordance with any of the embodiments disclosed herein.

FIG. 3D is a block diagram of a VGA arrangement with accompanying switching circuitry for use in the hearing device circuitry shown in FIGS. 3A and 3B in accordance with any of the embodiments disclosed herein. The switching circuitry includes a first switch 340 having a pole coupled to a phase shifter 306, a TX throw coupled to an input of a first VGA 305a, and an RX throw coupled to an output of a second VGA 305b. The switching circuitry also includes a second switch 342 having a pole coupled to an antenna 304, a TX throw coupled to an output of the first VGA 305a, and an RX throw coupled to an input of the second VGA 305b. In the embodiment shown in FIG. 3D, the first VGA 305a is used during a transmit mode, and the second VGA 305b is used during the receive mode. The first VGA 305a is preferably designed for efficiency and high-power output. The second VGA 305b is preferably a Low Noise Amplifier (LNA). The relative gains can be set similarly for both the first and second VGAs 305a, 305b (relative to gains of other pairs of first and second VGAs 305a, 305b of the hearing device circuitry shown in FIGS. 3A and 3B).

Figure 4:
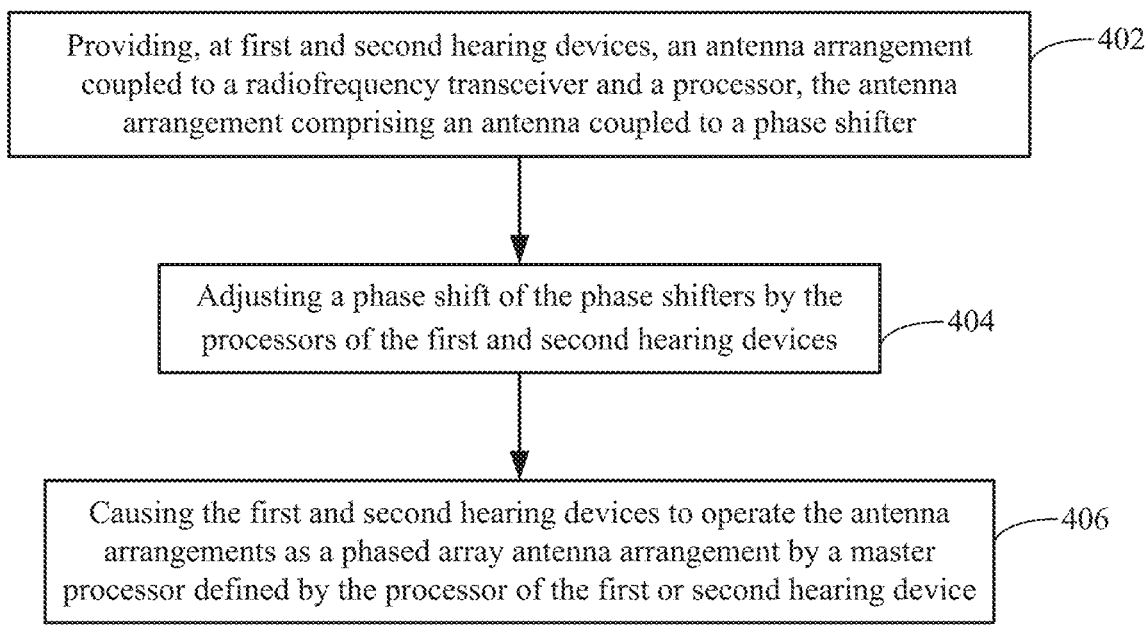
FIG. 4 illustrates a method of operating a phased array antenna arrangement of a hearing device system in accordance with any of the embodiments disclosed herein.

FIG. 4 illustrates a method of operating a phased array antenna arrangement formed from antennas of two hearing devices in accordance with any of the embodiments disclosed herein. The method shown in FIG. 4 involves providing 402, at first and second hearing devices, an antenna arrangement coupled to a radio frequency transceiver and a processor, the antenna arrangement comprising an antenna coupled to a phase shifter. The method also involves adjusting 404 a phase shift of the phase shifters by the processors of the first and second hearing devices. The method further involves causing 406 the first and second hearing devices to operate the antenna arrangements as a phased array antenna arrangement by a master processor defined by the processor of the first or second hearing device.

Figure 5:
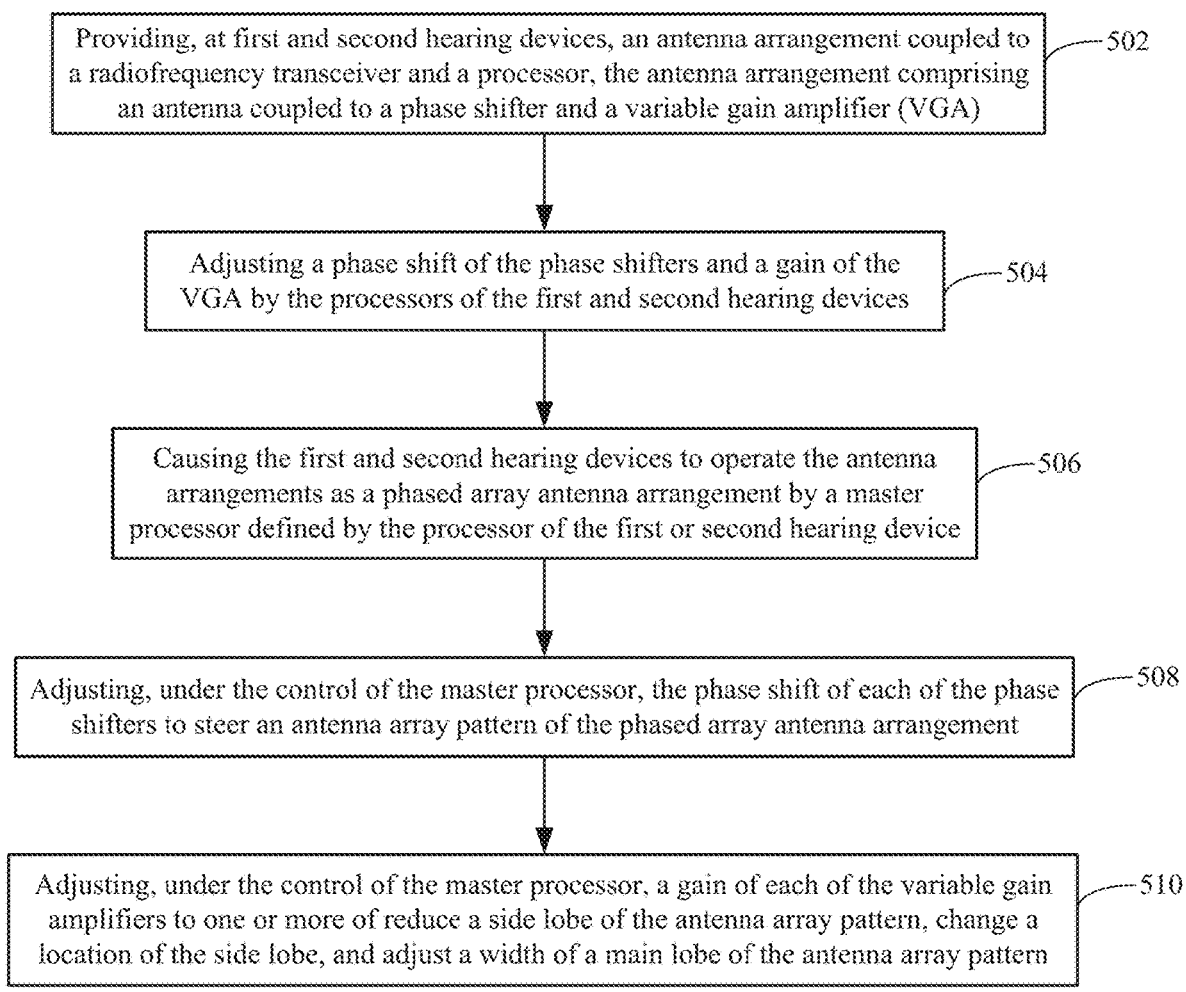
FIG. 5 illustrates a method of operating a phased array antenna arrangement of a hearing device system in accordance with any of the embodiments disclosed herein.

FIG. 5 illustrates a method of operating a phased array antenna arrangement from antennas of two hearing devices in accordance with any of the embodiments disclosed herein. The method shown in FIG. 5 involves providing 502, at first and second hearing devices, an antenna arrangement coupled to a radio frequency transceiver and a processor, the antenna arrangement comprising an antenna coupled to a phase shifter and a variable gain amplifier. The method also involves adjusting 504 a phase shift of the phase shifters and a gain of the VGA by the processors of the first and second hearing devices. The method further involves causing 506 the first and second hearing devices to operate the antenna arrangements as a phased array antenna arrangement by a master processor defined by the processor of the first or second hearing device. The method of FIG. 5 involves adjusting 508, under the control of the master processor, the phase shift of each of the phase shifters to steer an antenna array pattern of the phased array antenna arrangement, such as in one or both of an azimuth plane and an elevation plane. The method also involves adjusting 510, under the control of the master processor, a gain of each of the variable gain amplifiers to one or more of reduce a side lobe of the antenna array pattern, change a location of the side lobe, and adjust a width of a main lobe of the antenna array pattern.

Figure 6:
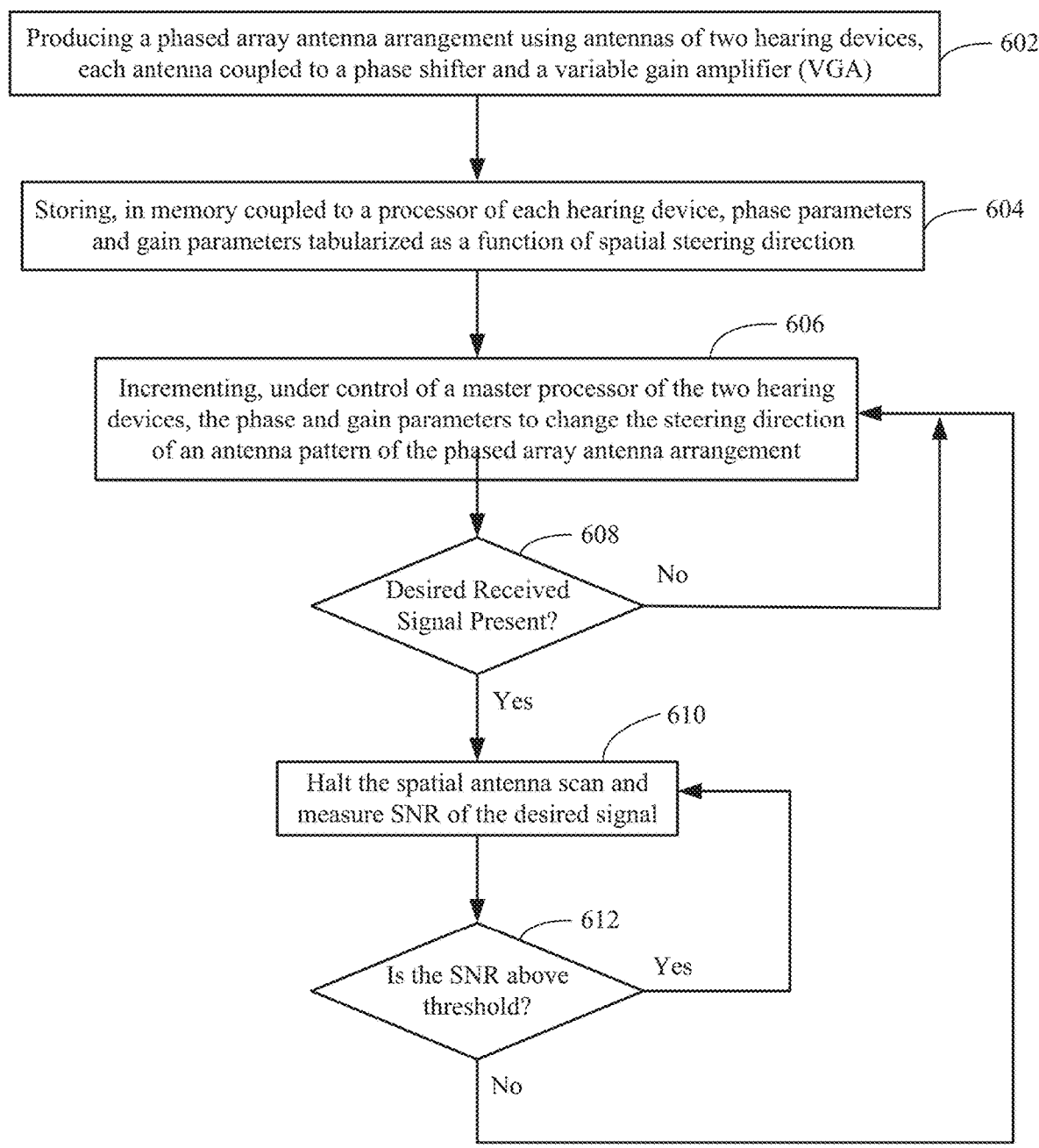
FIG. 6 illustrates a method of operating a phased array antenna arrangement of a hearing device system in accordance with any of the embodiments disclosed herein.

FIG. 6 illustrates a method of operating a phased array antenna arrangement formed from antennas of two hearing devices in accordance with any of the embodiments disclosed herein. The method shown in FIG. 6 involves producing 602 a phased array antenna arrangement using antennas of two hearing devices, each antenna coupled to a phase shifter and a variable gain amplifier. The method involves storing 604, in memory coupled to the processor of each hearing device, phase parameters and gain parameters tabularized as a function of spatial steering direction. The method also involves incrementing 606, under control of a master processor of the two hearing devices, the phase and gain parameters to change the steering direction of an antenna pattern of the phased array antenna arrangement, such as in one or both of an azimuth plane and an elevation plane.

A check 608 is made to determine if the desired received signal is present. If not, the phase and gain parameters are incremented 606 under control of the master processor to change the steering direction of the antenna array pattern. If the desired received signal is present 608, the spatial antenna scan is halted 610 by the master processor and the SNR of the desired signal is measured. A check 612 is made to determine if the SNR of the desired received signal is above a threshold. The threshold can be established based on the transceivers' modulation type/protocol and the use-case for the data sent/received. Each transceivers' modulation type/protocol and the use-case for the data sent/received will determine the bit error rate (BER) required for proper system performance. This BER has an associated SNR. For an FSK system, for example, typically a 12 dB to 14 dB SNR would be a suitable SNR. The threshold could be set for this SNR level. In other implementations, a suitable SNR threshold may be 3 dB. If above the threshold, the current steering direction of the antenna array pattern is maintained and the SNR of the desired received signal is measured 610. If the SNR of the desired received signal is below the threshold 612, the phase and gain parameters are incremented by the master processor to change the steering direction of the antenna array pattern 606. The processes of blocks 606-612 are repeated to steer the antenna array pattern in a direction that increases or maximizes the SNR of the desired received signal.

According to various embodiments, the antenna array pattern of a phased array antenna arrangement formed by antennas of two hearing devices can be spatially steered by a master processor of the hearing device system to increase or maximize the SNR of a received signal of interest. For example, an RSSI (Received Signal Strength Indicator) measurement can be made by the master processor of the hearing device without a signal present (e.g., on-channel receives noise). An RSSI measurement can be made by the master processor with the desired signal present. The master processor can calculate the SNR of the desired signal. Various methodologies can be implemented by the master processor of the hearing device system to maintain adequate SNR of the desired received signal. Five example embodiments for steering an antenna array pattern of a phased array antenna arrangement formed from antennas of two hearing devices are summarized below. Additionally or alternatively, even if the SNR threshold is significantly exceeded for a given/selected phased array antenna steering direction, the direction could be slightly dithered in multiple directions to find a local maximum of SNR, all the while operating without error in the TX/RX output.

Example 1

A spatial antenna scan is performed and the SNR of the desired received signal is measured incrementally as a function of spatial directions of the desired received signal, such as in a manner discussed previously. The phased array antenna array pattern can be steered to the direction of the centroid of measured directions which yields an adequate SNR (e.g., an SNR above a preset threshold). This antenna array pattern direction is maintained until the SNR falls below the threshold, at which point the scan and SNR measurement process is repeated.

Example 2

According to this example embodiment, the methodology of Example 1 is performed in a successive approximation manner for faster operation. According to this example, gross directional resolution sampling of the SNR of the desired received signal is performed, followed by successively reducing the resolution of the spatial steering/sampling. A spatially coarse (quick) sampling of the SNR can be subsequently refined by operating on the highest SNR sampled direction, while moving halfway over to adjacent spatial directions (e.g., effectively doubling the spatial resolution in the area about the maximum) while operating the transceiver-to-transceiver data all the while. This process further involves moving to the new maximum and repeating the refinement procedure.

Example 3

According to this example embodiment, if the measured SNR of the desired received signal at the currently steered spatial direction is above a threshold (e.g., a pre-set threshold), the antenna array pattern direction is maintained. If the measured SNR of the desired received signal at the currently steered spatial direction is below the threshold, a spatial antenna scan is performed as previously described (e.g., by incrementing or decrementing the spatial directions in a sequential manner) until an SNR of the desired received signal is measured above the threshold. A local versus global region of acceptable SNR may be chosen with this example embodiment. While not optimal, the steering methodology of this example embodiment is faster than other example embodiments while still providing an adequate SNR of the desired received signal.

Example 4

This example embodiment provides a methodology for steering a phased array antenna arrangement for frequency hop systems. According to this example embodiment, any of the embodiments of Examples 1-3 can be performed on a per channel frequency basis, with the antenna array pattern "hopping"/steering with each channel frequency. This example embodiment is particularly useful for mitigating multipath effects. For example, a dynamic antenna array pattern adjustment can be performed on each Bluetooth-like hop frequency to maximize SNR as needed for each frequency. This can be performed as part of an advanced adaptive frequency hopping (AFH) methodology.

Example 5

This example embodiment provides a methodology for steering a phased array antenna arrangement for servicing multiple independent (e.g., BLE) sessions. According to this example embodiment, the phased array antenna arrangement can be sequentially servicing multiple independent sessions. For example, the phased array antenna arrangement can be sequentially steered on a per session basis.

Figure 7:
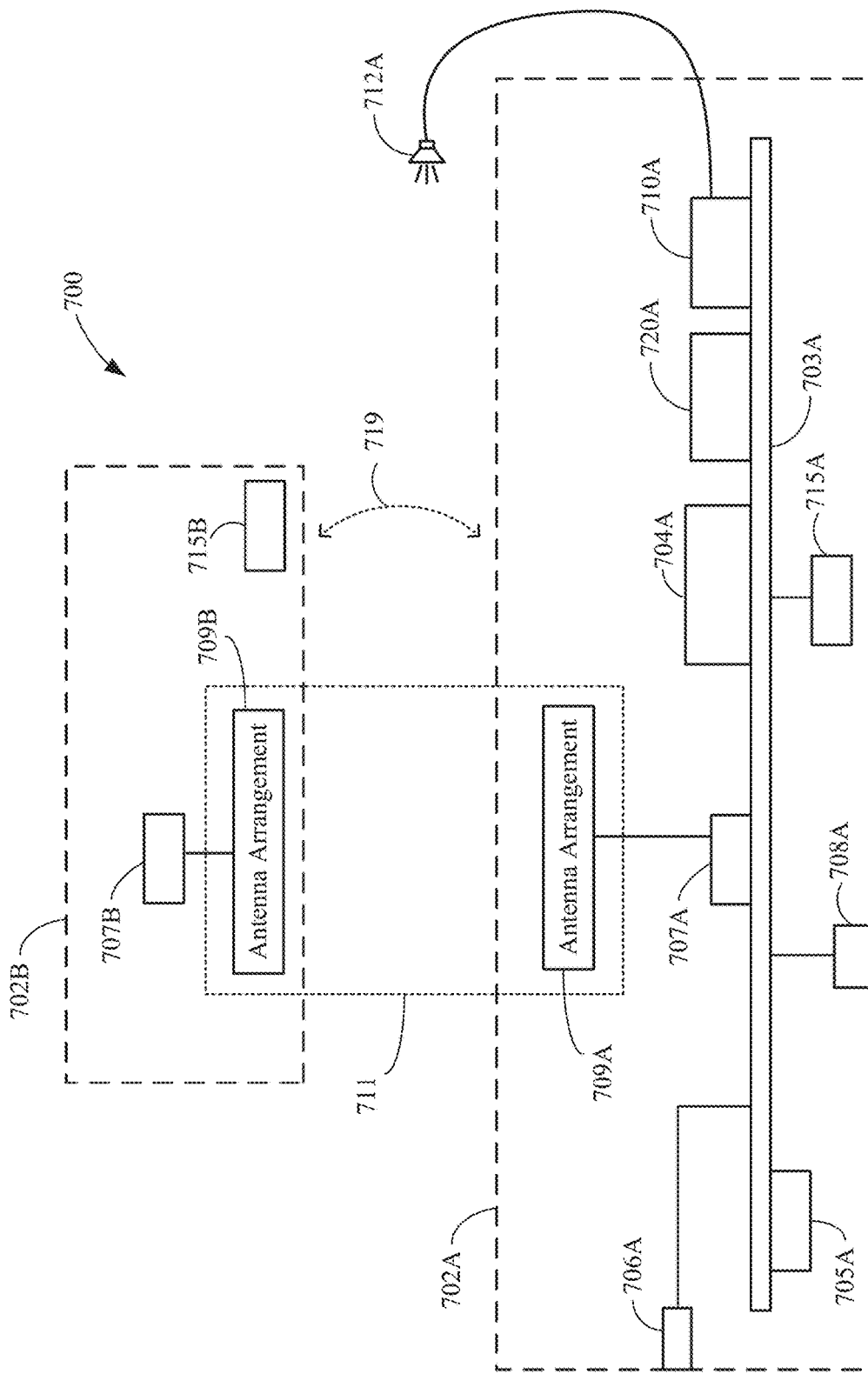
FIG. 7 is a block diagram showing various components of hearing devices whose antennas form a phased array antenna arrangement in accordance with any of the embodiments disclosed herein.

FIG. 7 is a block diagram of a hearing device system 700 which includes a pair of hearing devices 702A, 702B whose antennas operate cooperatively as a phased array antenna arrangement in accordance with any of the embodiments disclosed herein. The block diagram of FIG. 7 shows various components of a first hearing device 702A of the hearing device system 700. At least these components are included in a second hearing device 702B of the hearing device system 700, but are not shown for purposes of simplicity of explanation. The hearing devices 702A, 702B shown in FIG. 7 represent generic hearing devices for purposes of illustration. It is understood that the hearing devices 702A, 702B may exclude some of the components shown in FIG. 7 and/or include additional components. The components of the hearing devices 702A, 702B can be the same or different.

The hearing device 702A includes several components electrically connected to a circuit board 703A (e.g., flexible, non-flexible, or rigid-flex combination). A battery 705A is electrically connected to the circuit board 703A and provides power to the various components of the hearing device 702A. One or more microphones 706A are electrically connected to the circuit board 703A, which provides electrical communication between the microphones 706A and a digital signal processor (DSP) 704A. Among other components, the DSP 704A can incorporate or is coupled to audio signal processing circuitry. In some embodiments, a sensor arrangement 720A (e.g., a physiologic or motion sensor) is coupled to the DSP 704A via the circuit board 703A. One or more user switches 708A (e.g., on/off, volume, mic directional settings) are electrically coupled to the DSP 704A via the circuit board 703A.

An audio output device 710A is electrically connected to the DSP 704A via the circuit board 703A. In some embodiments, the audio output device 710A comprises a speaker (coupled to an amplifier). In other embodiments, the audio output device 710A comprises an amplifier coupled to an external receiver 712A adapted for positioning within an ear of a wearer. The hearing device 702A incorporates a communication device 707A coupled to the circuit board 703A and to an antenna 709A directly or indirectly via the circuit board 703A. The antenna 709A can be a single antenna or a phased array antenna arrangement comprising a plurality of antennas. Although not shown in FIG. 7, the antenna 709A is coupled to a phase shifter and, in some embodiments, to a VGA. The communication device 707A can be a Bluetooth® transceiver, such as a BLE (Bluetooth® low energy) transceiver or other transceiver (e.g., an IEEE 802.11 compliant device). The communication device 707A can be configured to communicate with one or more external devices, such as those discussed previously.

The hearing devices 702A, 702B also include a non-RF communication device 715A, 715B, such as an NFMI transceiver. The NFMI transceivers 715A, 715B support a communication link 719 (e.g., a high frequency magnetic link) between the communication devices 707A, 707B of the two hearing devices 702A, 702B. As previously discussed, the communication link 719 facilitates synchronization between the communication devices 707A, 707B of the two hearing devices 702A, 702B needed to operate antennas 709A, 709B cooperatively as a phased array antenna arrangement 711.

A hearing device system which provides a phased array antenna arrangement using antennas of two disparate hearing devices can be implemented to provide electronic steering of an antenna array pattern for wirelessly communicating with a variety of external devices located at a variety of positions relative to the hearing device system. For example, the external device can be located in the wearer's hand, in a pocket of a garment worn by the wearer, or at a position spaced apart from the wearer's body. The external device can be a smartphone, which may be in the wearer's hand, in a pocket, or off body, and the hearing device can be configured to receive audio and/or streaming data from the smartphone. The external device can be a remote microphone, which may be on or off body, and the hearing device can be configured to receive and/or stream data to/from the remote microphone. The external device may be a TV streamer located off body, and the hearing device system can be configured to receive audio from the TV streamer. The external device can be a remote control, which may be located on or off body, and the hearing device system can be configured to transmit and receive streaming data to/from the remote control. The external device can be a multi-functional accessory (e.g., a wireless bridge between the hearing device(s) and another wireless device(s), such as a smartphone or TV/audio streamer), which may be located on or off body, and the hearing device system can be configured to stream audio and/or data to/from the multi-functional accessory.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A hearing device system comprising a first hearing device and a second hearing device adapted to be worn at first and second ears of a wearer, the system comprising:
   a first hearing device and a second hearing device each comprising:
      a housing configured to be supported at, on or in the wearer's ear;
      a processor coupled to memory, the processor and memory disposed in the housing;
      a radio frequency transceiver coupled to the processor and disposed in the housing; and
      an antenna arrangement disposed in or on the housing and coupled to the transceiver and the processor, the antenna arrangement comprising an antenna coupled to a phase shifter, the processor configured to adjust a phase shift of the phase shifter;
   a clock synchronization link between the transceivers;
   a second link configured to communicate received signal information between the transceivers; and
   a master processor defined by the processor of the first or second hearing device, the master processor configured to cause the first and second hearing devices to operate the antenna arrangements as a phased array antenna arrangement via the clock synchronization link and the second link.

2. The hearing device system of claim 1, wherein the master processor is configured to coordinate adjustment of the phase of the phase shifters to steer an antenna array pattern of the phased array antenna arrangement.

3. The hearing device system of claim 2, wherein the master processor is configured adjust the phase of the phase shifters to steer a main lobe of the antenna array pattern in a direction of a desired radio frequency signal source that increases or maximizes a signal-to-noise ratio of a radio frequency signal received from the radio frequency signal source.

4. The hearing device system of claim 2, wherein the master processor is configured to steer a main lobe of the antenna array pattern in a direction that increases or maximizes a signal-to-noise ratio of a received radio frequency signal on a per channel frequency basis.

5. The hearing device system of claim 2, wherein the master processor is configured to steer the antenna array pattern in a direction that increases or maximizes a signal-to-noise ratio of a received radio frequency signal while concurrently nulling a radio frequency noise source or a multipath null contributor.

6. The hearing device system of claim 1, wherein:
   the memory is configured to store phase parameters tabularized as a function of spatial steering direction; and
   the processor is configured to adjust the phase shift of each of the phase shifters by sequentially applying the tabularized phase parameters.

7. The hearing device system of claim 6, wherein the phase parameters stored in the memory account for head-loading effects on the antenna array pattern.

8. The hearing device system of claim 1, wherein the transceiver and the antenna arrangement are configured to transmit and receive radio frequency signals within a 2.4 GHz ISM frequency band.

9. The hearing device system of claim 1, wherein:
   the antenna arrangements of the first and second hearing devices comprise first and second phased array antenna arrangements;
   the first and second phased array antenna arrangements comprise a plurality of antennas each coupled to one of a plurality of phase shifters; and
   the master processor is configured to cause the first and second hearing devices to operate the first and second phased array antenna arrangements as the phased array antenna arrangement.

10. A hearing device system comprising a first hearing device and a second hearing device adapted to be worn at first and second ears of a wearer, the system comprising:
    a first hearing device and a second hearing device each comprising:
       a housing configured to be supported at, on or in the wearer's ear;
       a processor coupled to memory, the processor and memory disposed in the housing;
       a radio frequency transceiver coupled to the processor and disposed in the housing; and
       an antenna arrangement disposed in or on the housing and coupled to the transceiver and the processor, the antenna arrangement comprising an antenna coupled to a phase shifter and a variable gain amplifier, the processor configured to adjust a phase shift of the phase shifter and adjust a gain of the variable gain amplifier;
    a clock synchronization link between the transceivers;
    a second link configured to communicate received signal information between the transceivers; and
    a master processor defined by the processor of the first or second hearing device, the master processor configured to cause the first and second hearing devices to operate the antenna arrangements as a phased array antenna arrangement via the clock synchronization link and the second link.

11. The hearing device system of claim 10, wherein the master processor is configured to:

coordinate adjustment of the phase of the phase shifters to steer an antenna array pattern of the phased array antenna arrangement; and adjust a gain of the variable gain amplifier to one or more of reduce a side lobe of the antenna array pattern, change a location of the side lobe, and adjust a width of a main lobe of the antenna array pattern.

12. The hearing device system of claim 11, wherein the master processor is configured adjust the phase of the phase shifters to steer a main lobe of the antenna array pattern in a direction of a desired radio frequency signal source that increases or maximizes a signal-to-noise ratio of a radio frequency signal received from the radio frequency signal source.

13. The hearing device system of claim 11, wherein the master processor is configured to steer a main lobe of the antenna array pattern in a direction that increases or maximizes a signal-to-noise ratio of a received radio frequency signal on a per channel frequency basis.

14. The hearing device system of claim 11, wherein the master processor is configured to steer the antenna array pattern in a direction that increases or maximizes a signal-to-noise ratio of a received radio frequency signal while concurrently nulling a radio frequency noise source or a multipath null contributor.

15. The hearing device system of claim 10, wherein:
the memory is configured to store phase parameters and gain parameters tabularized as a function of spatial steering direction; and
the master processor is configured to adjust the phase shift of each of the phase shifters and a gain of each of the variable gain amplifiers by sequentially applying the tabularized phase and gain parameters.

16. The hearing device system of claim 15, wherein the phase and gain parameters stored in the memory account for head-loading effects on the antenna array pattern.

17. The hearing device system of claim 10, wherein the transceiver and the antenna arrangement are configured to transmit and receive radio frequency signals within a 2.4 GHz ISM frequency band.

18. A method implemented by a hearing device system comprising a first hearing device and a second hearing device each adapted to be worn at, on or in an ear of a wearer, the method comprising:
providing, at the first and second hearing devices, an antenna arrangement coupled to a radio frequency transceiver and a processor, the antenna arrangement comprising an antenna coupled to a phase shifter;
adjusting a phase shift of the phase shifters by the processors of the first and second hearing devices;
providing a clock synchronization link between the transceivers of the first and second hearing devices;
communicating received signal information between the transceivers via a second link; and
causing the first and second hearing devices to operate the antenna arrangements as a phased array antenna arrangement by a master processor defined by the processor of the first or second hearing device via the clock synchronization link and the second link.

19. The method of claim 18, comprising steering, under control of the master processor, a main lobe of an antenna array pattern of the phased array antenna arrangement in a direction that increases or maximizes a signal-to-noise ratio of a received radio frequency signal.

20. The method of claim 18, comprising steering, under control of the master processor, a main lobe of an antenna array pattern of the phased array antenna arrangement in a direction that increases or maximizes a signal-to-noise ratio of a received radio frequency signal on a per channel frequency basis.

21. The method of claim 18, comprising steering, under control of the master processor, a main lobe of an antenna array pattern of the phased array antenna arrangement in a direction that increases or maximizes a signal-to-noise ratio of a received radio frequency signal while concurrently nulling a radio frequency noise source or a multipath null contributor.

22. The method of claim 18, wherein:
the antenna arrangements each comprise a variable gain amplifier coupled to the phase shifter and the antenna; and
the method comprises:
adjusting, under control of the master processor, the phase shift of each of the phase shifters to steer an antenna array pattern of the phased array antenna arrangement; and
adjusting, under control of the master processor, a gain of each of the variable gain amplifiers to one or more of reduce a side lobe of the antenna array pattern, change a location of the side lobe, and adjust a width of a main lobe of the antenna array pattern.

23. The method of claim 18, comprising transmitting and receiving radio frequency signals communicated on a per channel basis via the phased array antenna arrangement.

* * * * *